(12) United States Patent
Lawson et al.

(10) Patent No.: US 10,369,853 B2
(45) Date of Patent: *Aug. 6, 2019

(54) BEAD SEATER APPARATUS AND METHOD FOR USING THE SAME

(71) Applicant: Android Industries LLC, Auburn Hills, MI (US)

(72) Inventors: Lawrence J. Lawson, Troy, MI (US); Barry Allan Clark, Ortonville, MI (US)

(73) Assignee: Android Industries LLC, Auburn Hills, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/637,406

(22) Filed: Jun. 29, 2017

(65) Prior Publication Data

US 2017/0297387 A1    Oct. 19, 2017

Related U.S. Application Data

(63) Continuation of application No. 14/572,500, filed on Dec. 16, 2014, now Pat. No. 9,694,634, which is a continuation of application No. 13/594,516, filed on Aug. 24, 2012, now Pat. No. 8,915,285.

(51) Int. Cl.
*B60C 25/12* (2006.01)
*B60C 25/14* (2006.01)

(52) U.S. Cl.
CPC .............. *B60C 25/14* (2013.01); *B60C 25/12* (2013.01); *Y10T 29/49492* (2015.01)

(58) Field of Classification Search
CPC ....... B60C 25/12; B60C 25/14; B60C 25/142; B60C 25/147
See application file for complete search history.

(56) References Cited

U.S. PATENT DOCUMENTS

| | | | |
|---|---|---|---|
| 524,269 A | 8/1894 | West | |
| 2,900,015 A | 8/1959 | Harrison | |
| 3,978,903 A | 9/1976 | Mueller et al. | |
| 6,557,610 B2 | 5/2003 | Koerner et al. | |
| 7,165,593 B2 | 1/2007 | Schmatz et al. | |
| 7,640,963 B2 | 1/2010 | Lawson et al. | |
| 8,915,285 B2* | 12/2014 | Lawson | B60C 25/12 157/1.28 |
| 9,694,634 B2* | 7/2017 | Lawson | B60C 25/12 |
| 2011/0203362 A1 | 8/2011 | Imamura et al. | |
| 2011/0220297 A1 | 9/2011 | Clark et al. | |
| 2017/0225527 A1* | 8/2017 | Ichinose | B60C 25/12 |

FOREIGN PATENT DOCUMENTS

| | | |
|---|---|---|
| EP | 1841606 A2 | 10/2007 |
| JP | 10278521 A | 10/1998 |
| JP | 2007153214 A | 6/2007 |

OTHER PUBLICATIONS

International Search Report for Application No. PCT/US2012/055378 dated Mar. 26, 2013.
Office Action for U.S. Appl. No. 13/594,516 dated Jun. 12, 2014.

* cited by examiner

*Primary Examiner* — David B. Thomas
(74) *Attorney, Agent, or Firm* — Honigman LLP

(57) ABSTRACT

An apparatus for seating a bead of a tire adjacent a bead seat of a wheel is disclosed.

52 Claims, 21 Drawing Sheets

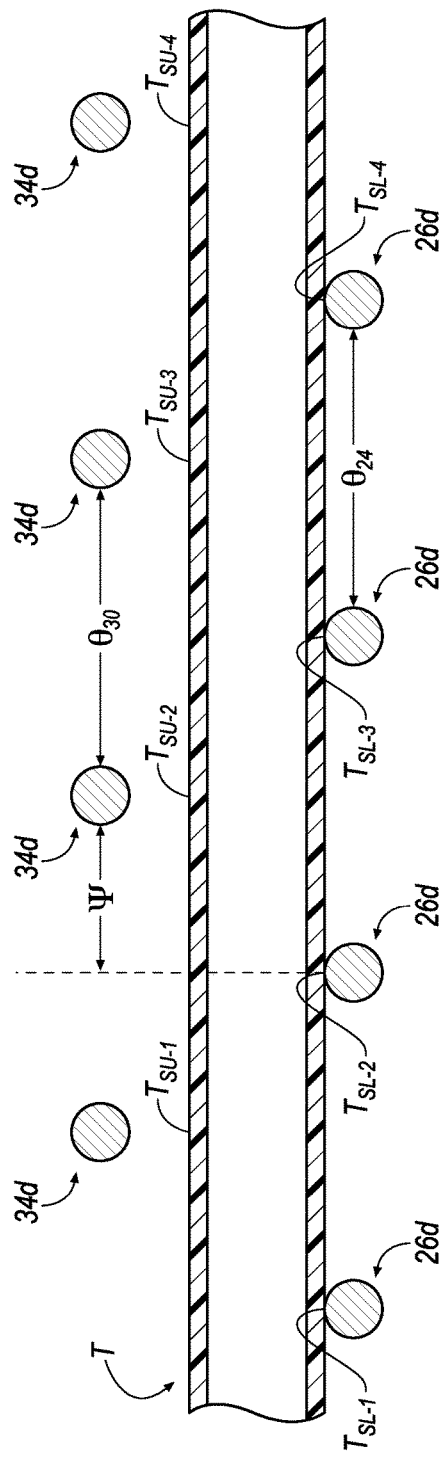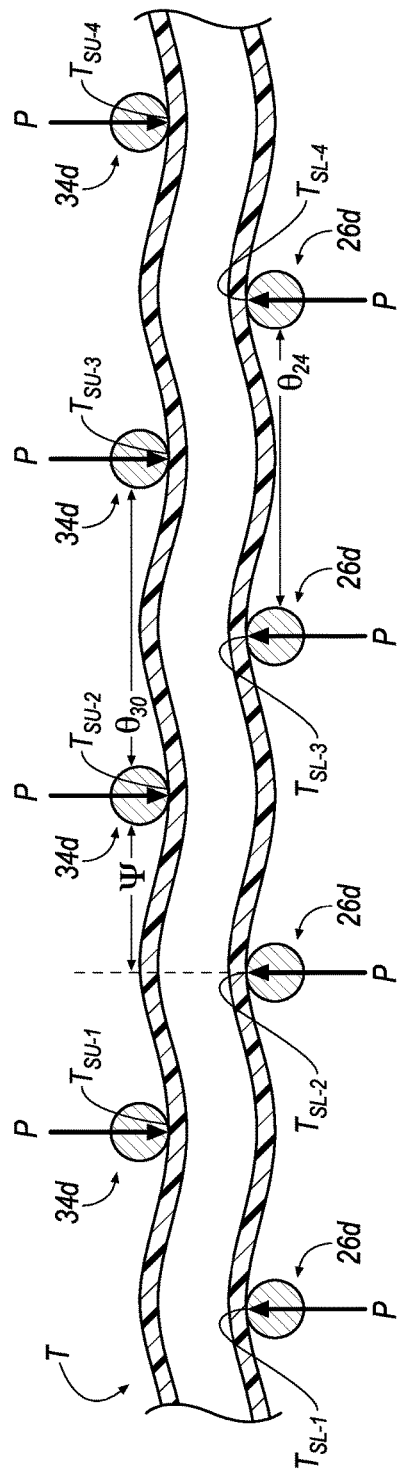

US 10,369,853 B2

BEAD SEATER APPARATUS AND METHOD FOR USING THE SAME

CROSS-REFERENCE TO RELATED APPLICATIONS

This U.S. patent application is a continuation of and claims priority to U.S. Utility application Ser. No. 14/572,500 filed on Dec. 16, 2014 now U.S. Pat. No. 9,694,634 issued on Jul. 4, 2017 which is a continuation of and claims priority to U.S. Ser. No. 13/594,516 filed on Aug. 24, 2012, the disclosure of which is considered part of the disclosure of this application and is hereby incorporated by reference in its entirety relates to a bead seater apparatus and a method for using the same.

FIELD

This disclosure relates to a bead seater apparatus and a method for using the same.

BACKGROUND

It is known in the art that a tire-wheel assembly is processed in several steps. Usually, conventional methodologies that conduct such steps require a significant capital investment and human oversight. The present disclosure provides several exemplary implementations that overcome drawbacks associated with the prior art by setting forth several devices that may be utilized for processing a tire-wheel assembly.

BRIEF DESCRIPTION OF THE DRAWINGS

The present disclosure will now be described, by way of example, with reference to the accompanying drawings, in which:

FIGS. 3A' and 3B' illustrate cross-sectional views of a tire and a portion of the bead seater apparatus according to line 3A'-3A' and 3B'-3B' of FIG. 2.

DETAILED DESCRIPTION

The Figures illustrate exemplary bead seater apparatus and a method for using the same. Based on the foregoing, it is to be generally understood that the nomenclature used herein is simply for convenience and the terms used to describe the implementations should be given the broadest meaning by one of ordinary skill in the art.

Prior to describing embodiments of the invention, reference is made to FIGS. 8A-8D, which illustrate an exemplary tire, T. Further, starting at FIG. 1A in the present disclosure, spatial reference may be made to the "upper," "lower," "left," "right" and "side" of the tire, T; although such nomenclature may be utilized to describe a particular portion or aspect of the tire, T, such nomenclature may be adopted due to the orientation of the tire, T, with respect to structure 10 that supports the tire, T. Accordingly, the above nomenclature should not be utilized to limit the scope of the claimed invention and is utilized herein for exemplary purposes in describing an embodiment of the invention.

In an embodiment, the tire, T, includes an upper sidewall surface, $T_{SU}$ (see, e.g., FIG. 8A), a lower sidewall surface, $T_{SL}$ (see, e.g., FIG. 8D), and a tread surface, $T_T$ (see, e.g., FIGS. 8B-8C), that joins the upper sidewall surface, $T_{SU}$, to the lower sidewall surface, $T_{SL}$. Referring to FIG. 8B, the upper sidewall surface, $T_{SU}$, may rise away from the tread surface, $T_T$, to a peak and subsequently descend at a slope to terminate at and form a circumferential upper bead, $T_{BU}$; similarly, the lower sidewall surface, $T_{SL}$, may rise away from the tread surface, $T_T$, to a peak and subsequently descend at a slope to terminate at and form a circumferential lower bead, $T_{BL}$.

As seen in FIG. 8B, the upper bead, $T_{BU}$, forms a circular, upper tire opening, $T_{OU}$; similarly, the lower bead, $T_{BL}$, forms a circular, lower tire opening, $T_{OL}$. It will be appreciated that when an external force is applied to the tire, T, the tire, T, may be physically manipulated, and, as a result, one or more of the upper tire opening, $T_{OU}$, and the lower tire opening, $T_{OL}$, may be temporality upset such that one or more of the upper tire opening, $T_{OU}$, and the lower tire opening, $T_{OL}$, is/are not entirely circular, but, may, for example, be manipulated to include a non-circular shape (e.g., an oval shape).

Referring to FIG. 8B, each of the upper tire opening, $T_{OU}$, and the lower tire opening, $T_{OL}$, may form, respectively, an upper tire opening diameter, $T_{OU-D}$, and a lower tire opening diameter, $T_{OL-D}$. Further, as seen in FIGS. 8A-8B, when in the relaxed, unbiased state, the upper sidewall surface, $T_{SU}$, and the lower sidewall surface, $T_{SL}$, define the tire, T, to include a tire diameter, $T_D$.

Figure 8A:
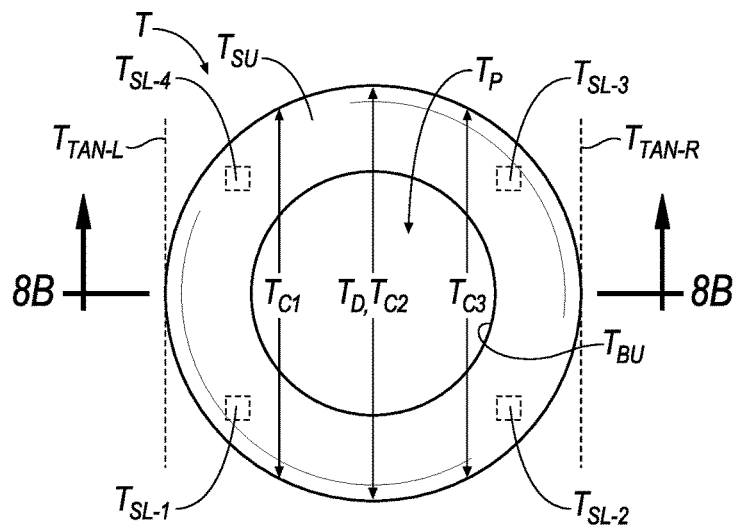
FIG. 8A illustrates a top view of a tire.
Figure 8B:
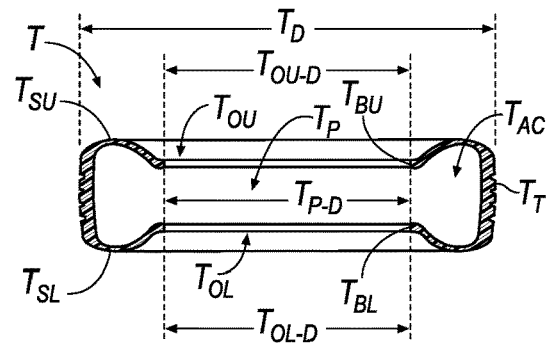
FIG. 8B illustrates a cross-sectional view of the tire according to line 8A-8A of FIG. 8A.
Figure 8C:
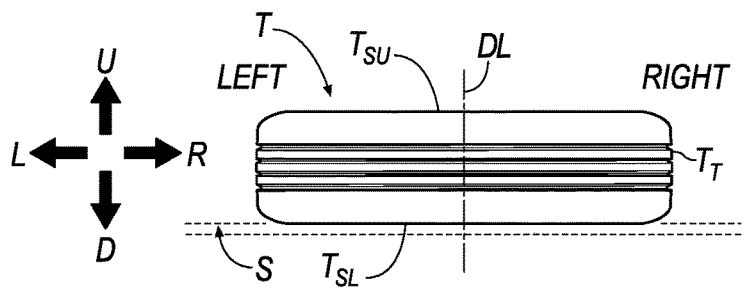
FIG. 8C illustrates a side view of the tire of FIG. 8A.
Figure 8D:
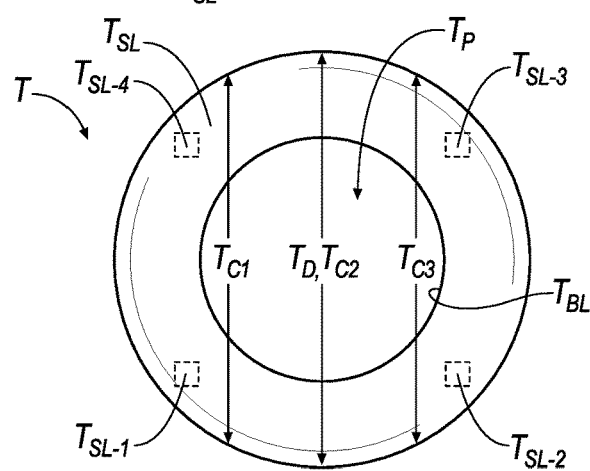
FIG. 8D illustrates a bottom view of the tire of FIG. 8A.

Referring to FIGS. 8A-8B and 8D, the tire, T, also includes a passage, $T_P$. Access to the passage, $T_P$, is permitted by either of the upper tire opening, $T_{OU}$, and the lower tire opening, $T_{OL}$. Referring to FIG. 8B, when the tire, T, is in a relaxed, unbiased state, the upper tire opening, $T_{OU}$, and the lower tire opening, $T_{OL}$, define the passage, $T_P$, to include a diameter, $T_{P-D}$. Referring also to FIG. 8B, the tire, T, includes a circumferential air cavity, $T_{AC}$, that is in communication with the passage, $T_P$. After joining the tire, T, to a wheel, W (see, e.g., FIGS. 9A-9D), pressurized air is deposited into the circumferential air cavity, $T_{AC}$, for inflating the tire, T.

When the tire, T, is arranged adjacent structure as described in the following disclosure starting at FIG. 1A, two or more portions of one or more of the lower sidewall surface, $T_{SL}$, and the upper sidewall surface, $T_{SU}$, of the tire, T, may be disposed adjacent the structure 10. In some circumstances, the structure 10 may provide two or more points of support, and, as such, in an example, two or more portions of the lower sidewall surface, $T_{SL}$, of the tire, T, may be disposed adjacent the structure. Accordingly, reference is made to each of FIGS. 8A and 8D in order to identify four exemplary portions of each of the upper sidewall surface, $T_{SU}$, of the tire, T, and the lower sidewall surface, $T_{SL}$, of the tire, T, that may be disposed adjacent the structure (e.g., roller members 26d, 34d of each of a lower and upper tire-sidewall-surface-engaging devices 26, 34) at reference signs, $T_{SU-1}$, $T_{SU-2}$, $T_{SU-3}$, $T_{SU-4}$, $T_{SL-1}$, $T_{SL-2}$, $T_{SL-3}$, $T_{SL-4}$, which may be respectively be referred to as a first portion, a second portion, a third portion and a fourth portion of each of the upper and lower sidewall surfaces, $T_{SU}$, $T_{SL}$, of the tire, T. Because the tire, T, may be rotationally moved about an axis, A-A, relative to the structure (as seen in, e.g., FIGS. 5 and 6B-6C), the four points of support on each of the upper and lower sidewall surfaces, $T_{SU}$, $T_{SL}$, of the tire, T, may not necessarily be limited to the portions that are identified at FIGS. 8A and 8D, and, as such the four points of support may be located at other regions of the upper and lower sidewall surfaces, $T_{SU}$, $T_{SL}$, of the tire, T.

Further, when the tire, T, is arranged adjacent structure 10 or a wheel, W (see, e.g., FIGS. 9A-9D), as described in the following disclosure, the written description may reference a "left" portion or a "right" portion of the tire, T. Referring to FIG. 8C, the tire, T, is shown relative to a support member, S; the support member, S, is provided (and shown in phantom) in order to establish a frame of reference for the "left" portion and the "right" portion of the tire, T. In FIG. 8C, the tire, T, is arranged in a "non-rolling" orientation such that the tread surface, $T_T$, is not disposed adjacent the phantom support member, S, but, rather the lower sidewall surface, $T_{SL}$, is disposed adjacent the phantom support member, S. A center diving line, DL, equally divides the "non-rolling" orientation of the tire, T, in half in order to generally indicate a "left" portion of the tire, T, and a "right" portion of the tire, T.

As discussed above, reference is made to several diameters, $T_{P-D}$, $T_{OU-D}$, $T_{OL-D}$ of the tire, T. According to geometric theory, a diameter passes through the center of a circle, or, in the present disclosure, the axial center of the tire, T, which may alternatively be referred to as an axis of rotation of the tire, T. Geometric theory also includes the concept of a chord, which is a line segment that whose endpoints both lie on the circumference of a circle; according to geometric theory, a diameter is the longest chord of a circle.

In the following description, the tire, T, may be moved relative to structure; accordingly, in some instances, a chord of the tire, T, may be referenced in order to describe an embodiment of the invention. Referring to FIG. 8A, several chords of the tire, T, are shown generally at $T_{C1}$, $T_{C2}$ (i.e., the tire diameter, $T_D$) and $T_{C3}$.

The chord, $T_{C1}$, may be referred to as a "left" tire chord. The chord, $T_{C3}$, may be referred to as a "right" tire chord. The chord, $T_{C2}$, may be equivalent to the tire diameter, $T_D$, and be referred to as a "central" chord. Both of the left and right tire chords, $T_{C1}$, $T_{C3}$, include a geometry that is less than central chord, $T_{C2}$, / tire diameter, $T_D$.

In order to reference the location of the left chord, $T_{C1}$, and the right chord, $T_{C3}$, reference is made to a left tire tangent line, $T_{TAN-L}$, and a right tire tangent line, $T_{TAN-R}$. The left chord, $T_{C1}$, is spaced apart approximately one-fourth of the tire diameter, $T_D$, from the left tire tangent line, $T_{TAN-L}$. The right chord, $T_{C3}$, is spaced apart approximately one-fourth of the tire diameter, $T_D$, from the right tire tangent line, $T_{TAN-R}$. Each of the left and right tire chords, $T_{C1}$, $T_{C3}$, may be spaced apart about one-fourth of the tire diameter, $T_D$, from the central chord, $T_{C2}$. The above spacings referenced from the tire diameter, $T_D$, are exemplary and should not be meant to limit the scope of the invention to approximately a one-fourth ratio; accordingly, other ratios may be defined, as desired.

Further, as will be described in the following disclosure, the tire, T, may be moved relative to structure 10. Referring to FIG. 8C, the movement may be referenced by an arrow, U, to indicate upwardly movement or an arrow, D, to indicate downwardly movement. Further, the movement may be referenced by an arrow, L, to indicate left or rearwardly movement or an arrow, R, to indicate right or forwardly movement.

Prior to describing embodiments of the invention, reference is made to FIGS. 9A-9D, which illustrate an exemplary wheel, W. Further, starting at FIG. 1A in the present disclosure, reference may be made to the "upper," "lower," "left," "right" and "side" of the wheel, W; although such nomenclature may be utilized to describe a particular portion or aspect of the wheel, W, such nomenclature may be adopted due to the orientation of the wheel, W, with respect to structure 10 that supports the wheel, W. Accordingly, the above nomenclature should not be utilized to limit the scope of the claimed invention and is utilized herein for exemplary purposes in describing an embodiment of the invention.

Figure 9A:
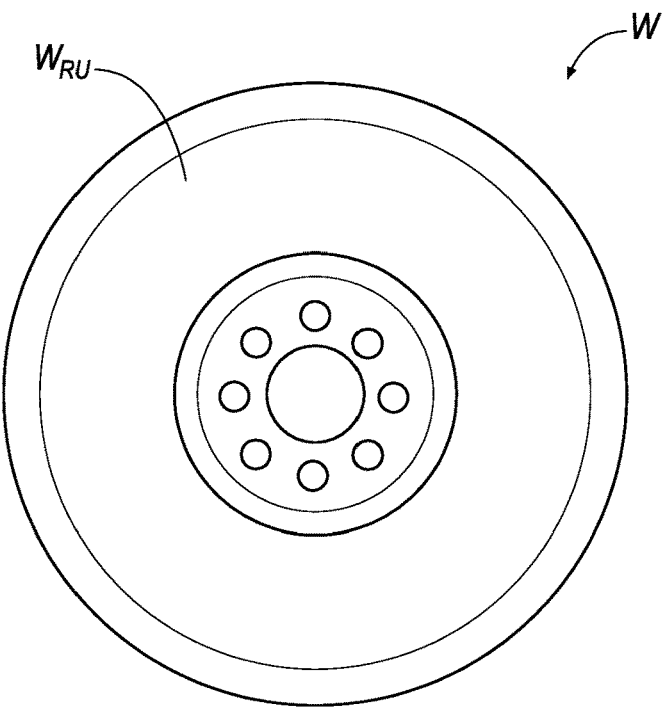
FIG. 9A illustrates a top view of a wheel.
Figure 9B:
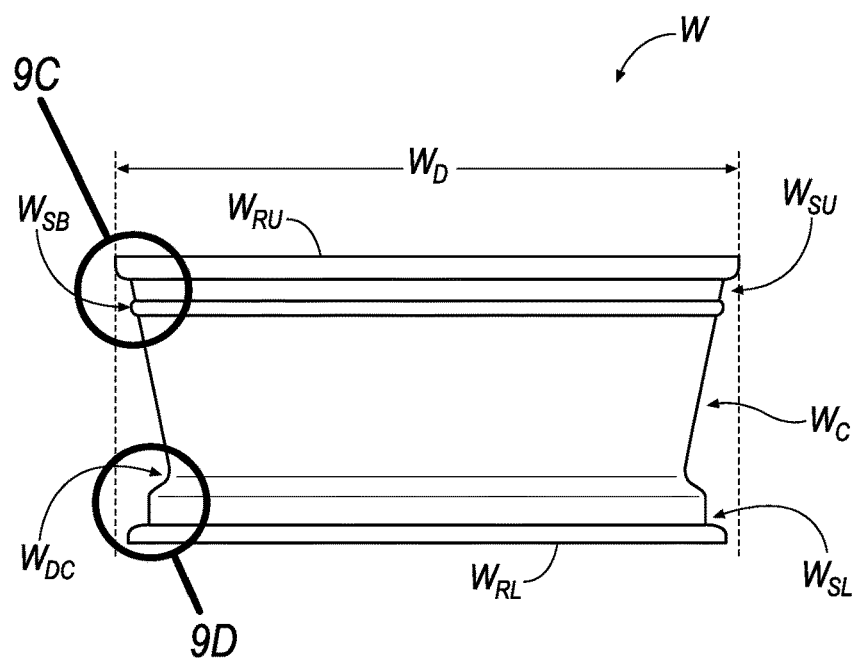
FIG. 9B illustrates a side view of the wheel of FIG. 9A.

In an embodiment, the wheel, W, includes an upper rim surface, $W_{RU}$, a lower rim surface, $W_{RL}$, and an outer circumferential surface, $W_C$, that joins the upper rim surface, $W_{RU}$, to the lower rim surface, $W_{RL}$. Referring to FIG. 9B, upper rim surface, $W_{RU}$, forms a wheel diameter, $W_D$. The wheel diameter, $W_D$, may be non-constant about the circumference, $W_C$, from the upper rim surface, $W_{RU}$, to the lower rim surface, $W_{RL}$. The wheel diameter, $W_D$, formed by the upper rim surface, $W_{RU}$, may be largest diameter of the non-constant diameter about the circumference, $W_C$, from the upper rim surface, $W_{RU}$, to the lower rim surface, $W_{RL}$. The wheel diameter, $W_D$, is approximately the same as, but slightly greater than the diameter, $T_{P-D}$, of the passage, $T_P$, of the tire, T; accordingly, once the wheel, W, is disposed within the passage, $T_P$, the tire, T, may flex and be frictionally-secured to the wheel, W, as a result of the wheel diameter, $W_D$, being approximately the same as, but slightly greater than the diameter, $T_{P-D}$, of the passage, $T_P$, of the tire, T.

Figure 10A:
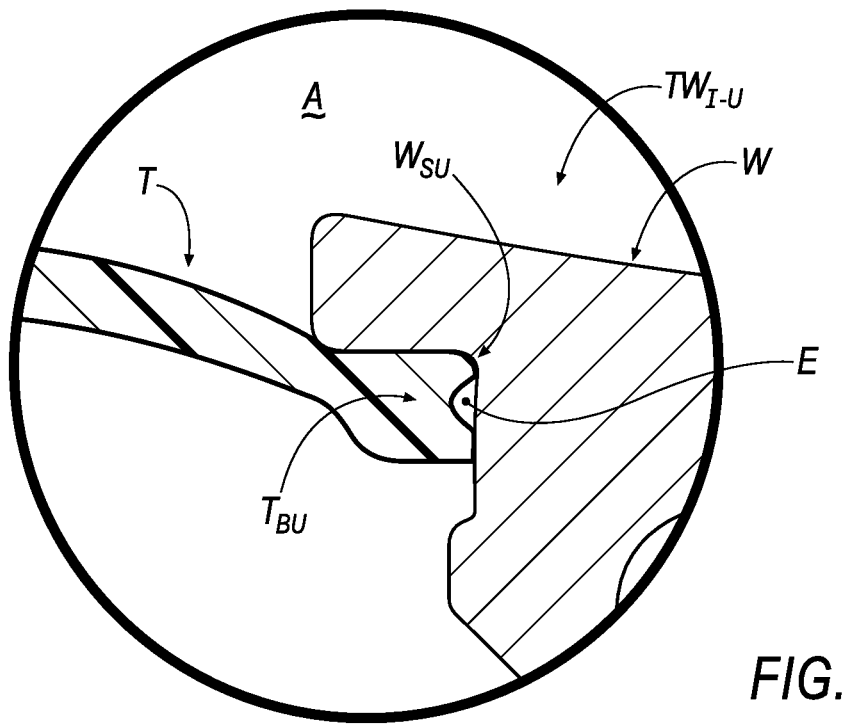
FIG. 10A illustrates an enlarged cross-sectional view of a tire-wheel assembly including an entrapment located between a bead of a tire and a bead seat of a wheel.
Figure 10B:
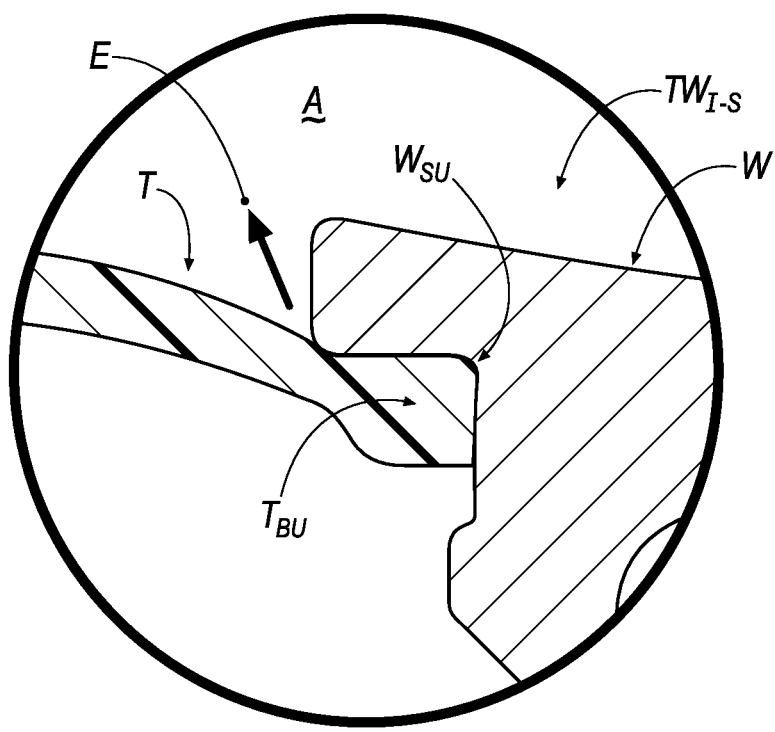
FIG. 10B illustrates an enlarged cross-sectional view of a tire-wheel assembly that does not include an entrapment located between a bead of a tire and a bead seat of a wheel.

The outer circumferential surface, $W_C$, of the wheel, W, further includes an upper bead seat, $W_{SU}$, and a lower bead seat, $W_{SL}$. The upper bead seat, $W_{SU}$, forms a circumferential cusp, corner or recess that is located proximate the upper rim surface, $W_{RU}$. The lower bead seat, $W_{SL}$, forms a circumferential cusp, corner or recess that is located proximate the lower rim surface, $W_{RL}$. Referring to FIGS. 10A-10B, upon inflating the tire, T, the pressurized air causes the upper bead, $T_{BU}$, to be disposed adjacent and "seat" in the upper bead seat, $W_{SU}$; similarly, upon inflating the tire, T, the pressurized air causes the lower bead, $T_{BL}$, to be disposed adjacent and "seat" in the lower bead seat, $W_{SL}$.

The non-constant diameter of the outer circumference, $W_C$, of the wheel, W, further forms a wheel "drop center," $W_{DC}$. A wheel drop center, $W_{DC}$, may include the smallest diameter of the non-constant diameter of the outer circumference, $W_C$, of the wheel, W. Functionally, the wheel drop center, $W_{DC}$, may assist in the mounting of the tire, T, to the wheel, W.

The non-constant diameter of the outer circumference, $W_C$, of the wheel, W, further forms an upper "safety bead," $W_{SB}$. In an embodiment, the upper safety bead may be located proximate the upper bead seat, $W_{SU}$. In the event that pressurized air in the circumferential air cavity, $T_{AC}$, of the tire, T, escapes to atmosphere, the upper bead, $T_{BU}$, may "unseat" from the upper bead seat, $W_{SU}$; because of the proximity of the safety bead, $W_{SB}$, the safety bead, $W_{SB}$, may assist in the mitigation of the "unseating" of the upper bead, $T_{BU}$, from the upper bead seat, $W_{SU}$, by assisting in the retaining of the upper bead, $T_{BU}$, in a substantially seated orientation relative to the upper bead seat, $W_{SU}$. In some embodiments, the wheel, W, may include a lower safety bead (not shown); however, upper and/or lower safety beads may be included with the wheel, W, as desired, and are not required in order to practice the invention described in the following disclosure.

Figure 9C:
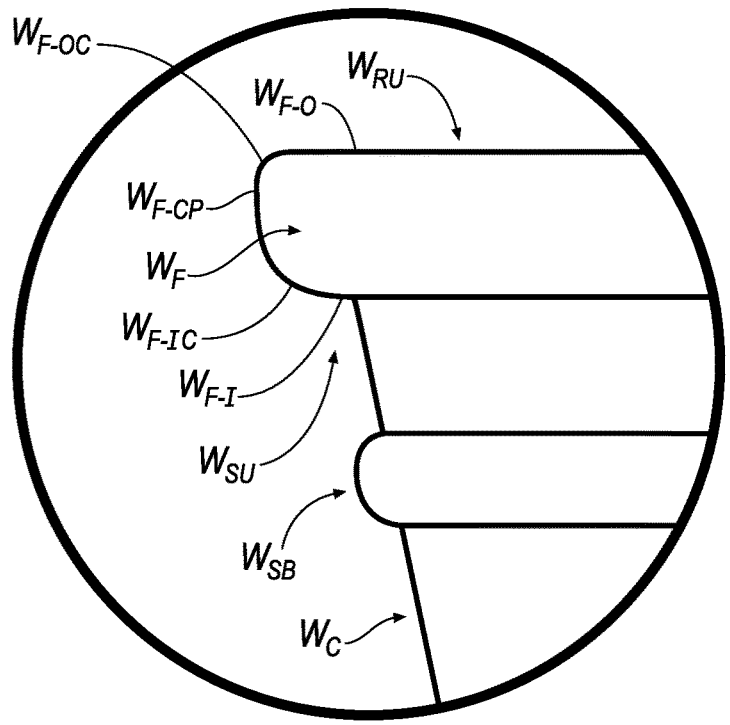
FIG. 9C illustrates an enlarged view of the wheel according to line 9C of FIG. 9B.

Referring to FIG. 9C, the upper bead seat, $W_{SU}$, is formed, at least in part, by a portion of the outer circumference, $W_C$, of the wheel, W, and the upper rim surface, $W_{RU}$, of the wheel, W. Similarly, referring to FIG. 9D, the lower bead seat, $W_{SL}$, is formed, at least in part, by the outer circumference, $W_C$, of the wheel, W, and the lower rim surface, $W_{RL}$, of the wheel, W.

Figure 9D:
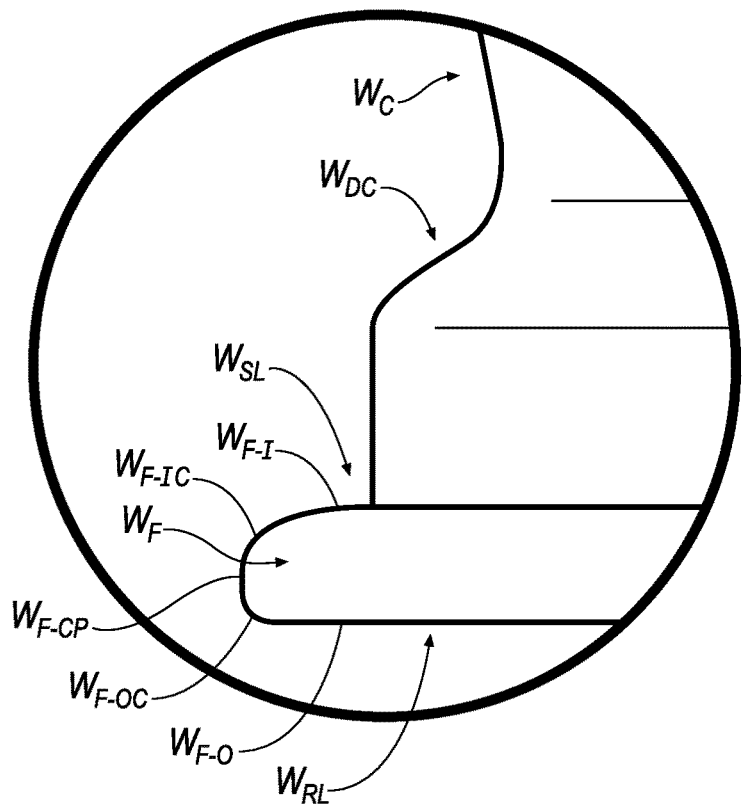
FIG. 9D illustrates an enlarged view of the wheel according to line 9D of FIG. 9B.

Referring to both of FIGS. 9C and 9D, each of the upper rim surface, $W_{RU}$, and the lower rim surface, $W_{RL}$, are described to include a flange, $W_F$; the flange, $W_F$, of the upper rim surface, $W_{RU}$, in combination with a portion of the outer circumference, $W_C$, of the wheel, W, contributes to the formation of the upper bead seat, $W_{SU}$, of the wheel, W, and, the flange, $W_F$, of the lower rim surface, $W_{RL}$, in combination with a portion of the outer circumference, $W_C$, of the wheel, W, contributes to the formation of the lower bead seat, $W_{SL}$, of the wheel, W. The flange, $W_F$, may include: a flange outboard surface, $W_{F-O}$, a flange outboard corner/flange edge radius, $W_{F-OC}$, a flange circumferential perimeter, $W_{F-CP}$, a flange inboard corner/flange radius, $W_{F-IC}$ and a flange inboard surface, $W_{F-I}$.

Referring now to FIGS. 1A-1E, an apparatus 10 is shown according to an embodiment. The apparatus 10 is supported by/connected to an underlying ground surface, G.

Figure 1A:
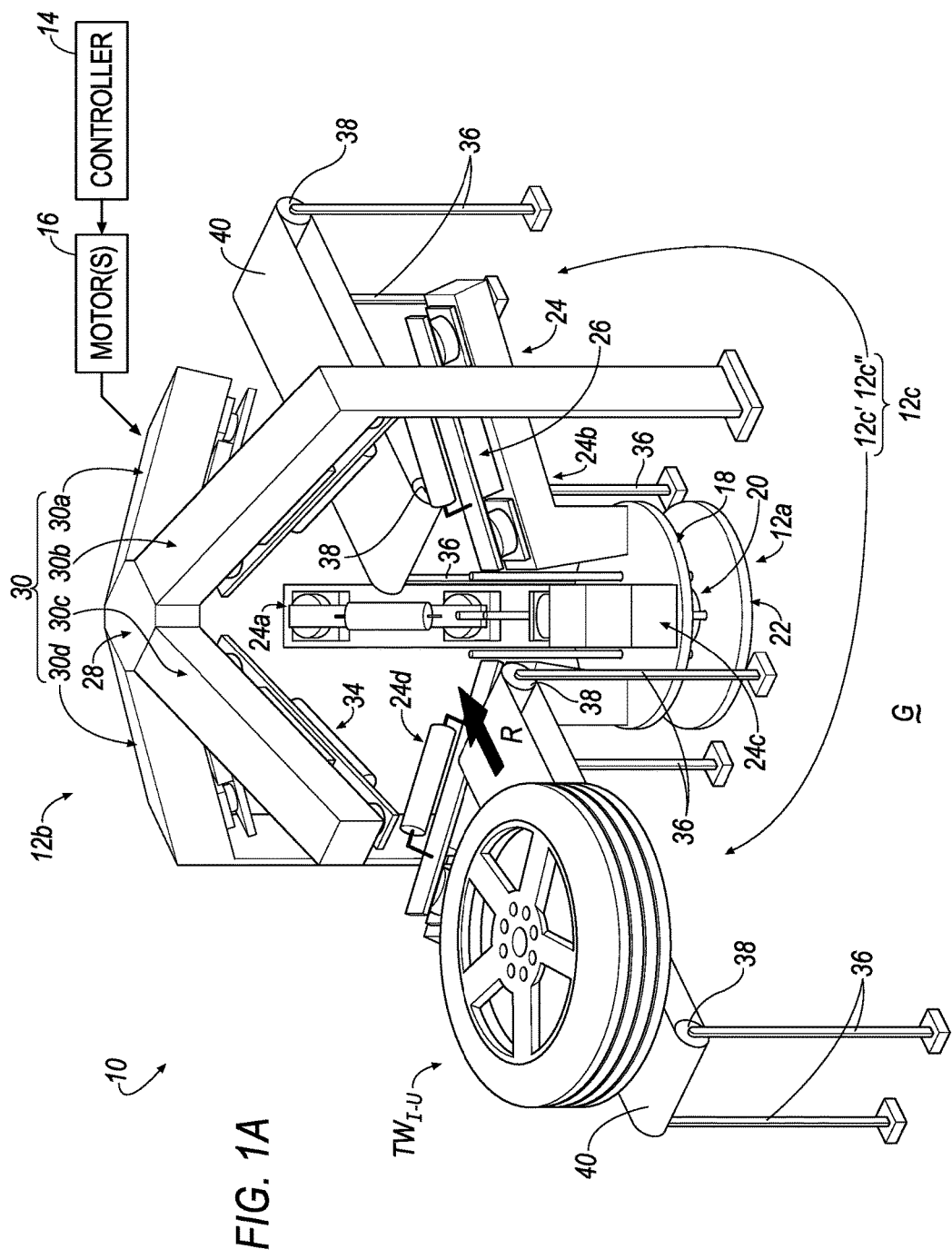
FIGS. 1A-1E illustrate views of an exemplary bead seater apparatus.
Figure 1B:
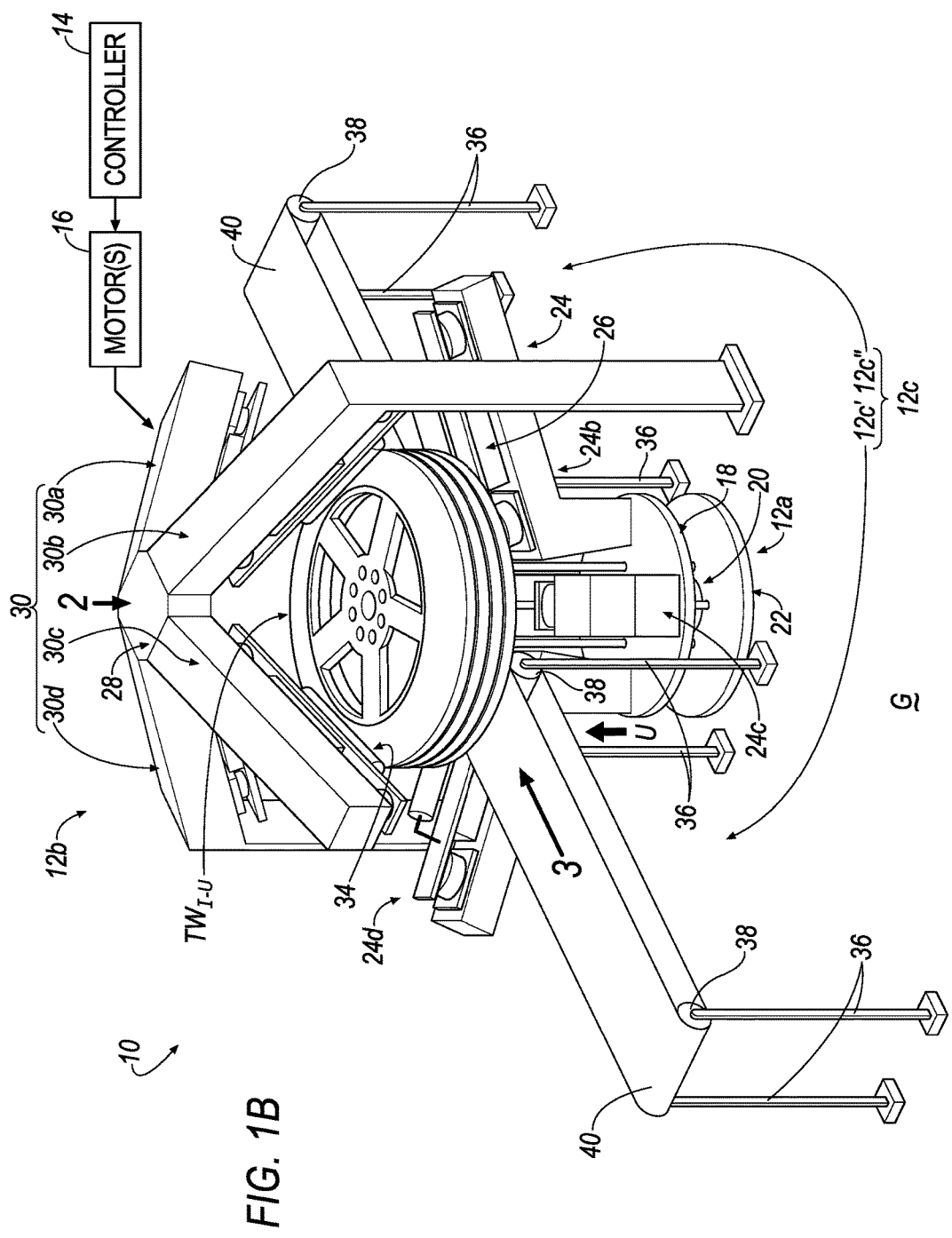
Figure 1C:
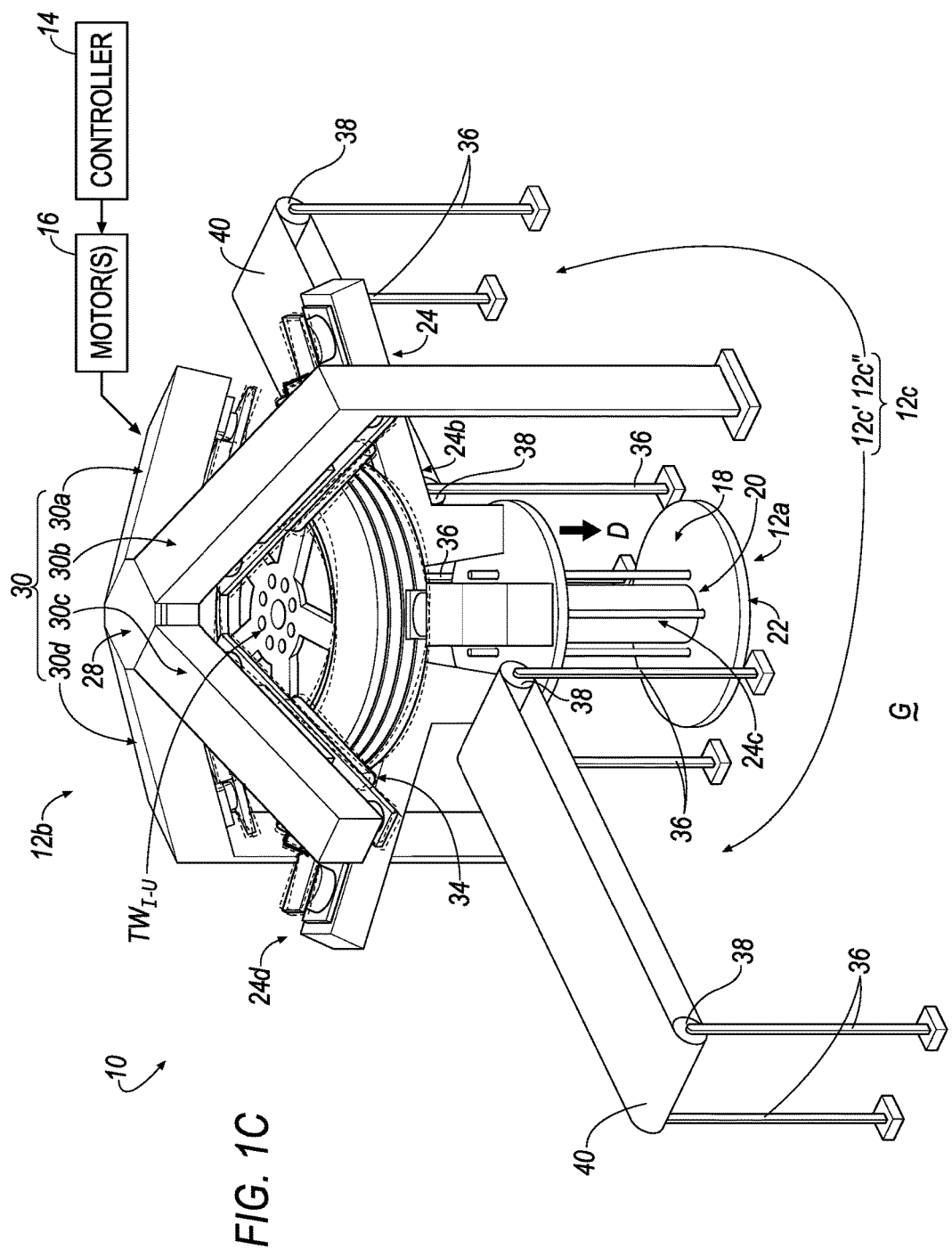
Figure 1D:
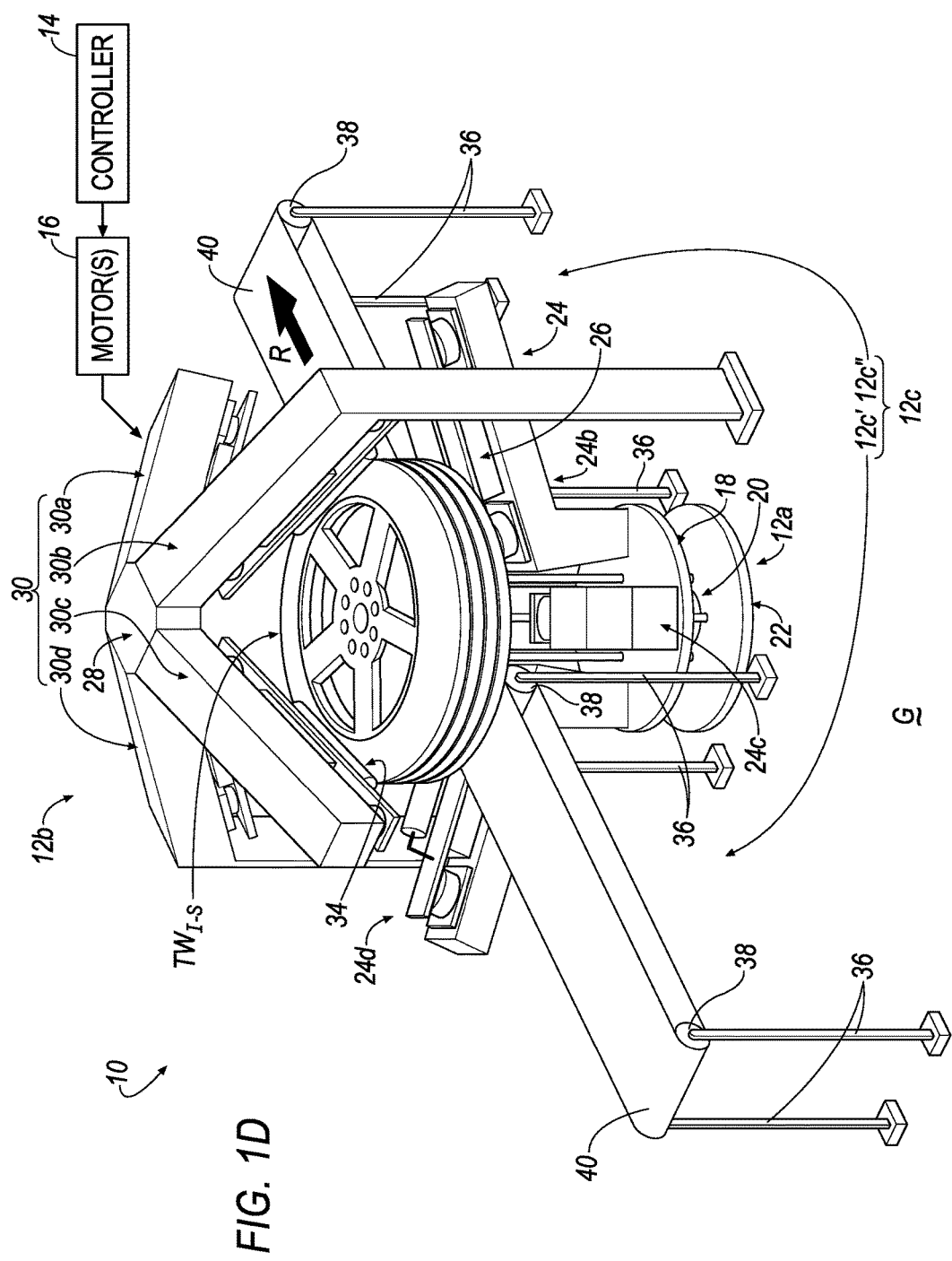
Figure 1E:
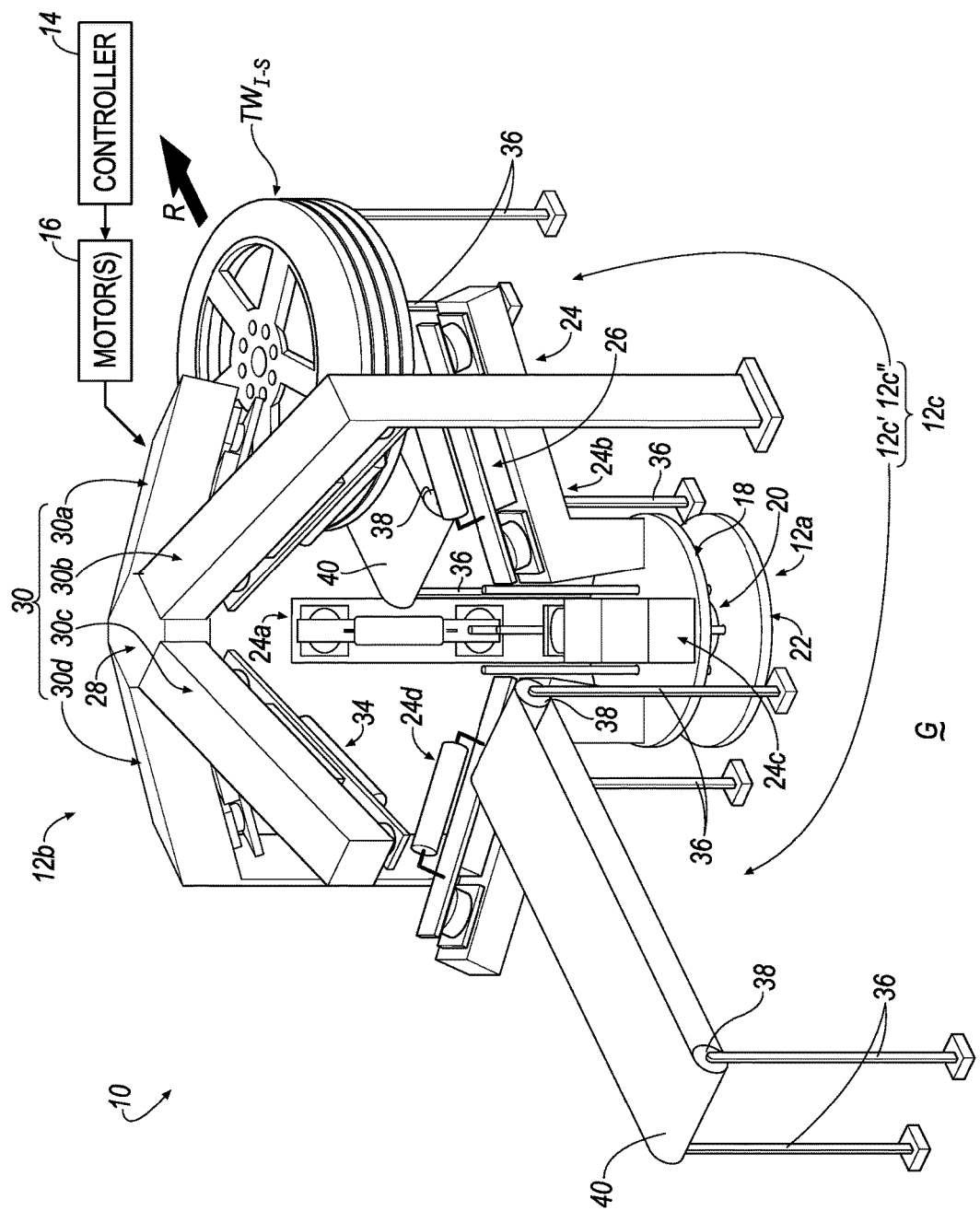

The apparatus conducts "work" upon an inflated tire-wheel assembly $TW_{I-U}$ (see, e.g., FIGS. 1A-1C)/$TW_{I-S}$ (see, e.g., FIGS. 1D-1E). Referring to FIGS. 1A-1C, prior to the apparatus 10 conducting "work" upon the inflated tire-wheel assembly, $TW_{I-U}$/$TW_{I-S}$, the inflated tire-wheel assembly, $TW_{I-U}$/$TW_{I-S}$, is generally referred to by the reference number "$TW_{I-U}$." Referring to FIGS. 1D-1E, after the apparatus 10 conducts "work" upon the inflated tire-wheel assembly, the inflated tire-wheel assembly is generally referred to by the reference number "$TW_{I-S}$."

The letter "U" in the reference sign, "$TW_{I-U}$," may generally correspond to the inflated tire-wheel assembly, $TW_{I-U}$, as not yet being processed (i.e., the inflated tire-wheel assembly, $TW_{I-U}$, is "unprocessed"), or, alternatively that the inflated tire-wheel assembly, $TW_{I-U}$, is arranged in, for example, an "unseated" orientation (i.e., an "unseated" orientation may mean that the inflated tire-wheel assembly, $TW_{I-U}$, includes one or more entrapments, E, as seen in FIG. 10A), whereas, the letter "S" in the reference sign, "$TW_{I-S}$," may generally correspond to the inflated tire-wheel assembly, $TW_{I-S}$, as being arranged in, for example, a "seated" orientation (i.e., a "seated" orientation may mean that the inflated tire-wheel assembly, $TW_{I-S}$, does not include one or more entrapments, E, as seen in FIG. 10B). Although the letter "U" in the reference sign, "$TW_{I-U}$," may generally correspond to the inflated tire-wheel assembly, $TW_{I-U}$, as being arranged in an "unseated" orientation, the inflated tire-wheel assembly, $TW_{I-U}$, may, however, be presented to the apparatus 10 in a seated orientation; however, due to the nature of the tire, T, being mounted upon the wheel, W, in an inflated state, the un/seated orientation of the tire-wheel assembly, $TW_{I-U}$, may not be easily perceived or detectable by the human eye; therefore, if the tire-wheel assembly, $TW_{I-U}$, is presented to the apparatus 10 in a "seated" orientation, the tire-wheel assembly, $TW_{I-U}$, may be alternatively referred to as an "unprocessed" tire-wheel assembly, $TW_{I-U}$, due to the fact that the apparatus 10 has not yet conducted "work" upon the inflated tire-wheel assembly, $TW_{I-U}$.

Functionally, the apparatus 10 "seats" the circumferential upper bead, $T_{BU}$, and the circumferential lower bead, $T_{BL}$, of the tire, T, upon, respectively, the upper bead seat, $W_{SU}$, and the lower bead seat, $W_{SL}$, of the wheel, W. Accordingly, the apparatus 10 may be referred to as a "bead seater apparatus," and, the "work" conducted by the bead seater apparatus 10 may include the act(s) of: manipulating a spatial orientation of the tire, T, relative the wheel, W, and/or manipulating a spatial orientation of the wheel, W, relative the tire, T. By manipulating a spatial orientation of the tire, T, relative the wheel, W, and/or the wheel, W, relative the tire, T, one or more entrapments, E (see, e.g., FIG. 10A), such as, for example, (an) air bubble(s), lubrication, (a) contaminate(s) or the like may be removed (see FIG. 10B) from the inflated tire-wheel assembly, $TW_{I-U}$. Manipulating a spatial orientation of the tire, T, relative the wheel, W, and/or manipulating a spatial orientation of the wheel, W, relative the tire, T, may include one or more of the acts of: compressing the inflated tire-wheel assembly, $TW_{I-U}$, vibrating the inflated tire-wheel assembly, $TW_{I-U}$, and rotating the inflated tire-wheel assembly, $TW_{I-U}$.

Referring to FIG. 10A, the one or more entrapments, E, is/are "contained by" the inflated tire-wheel assembly, $TW_{I-U}$. In some circumstances, the one or more entrapments, E, may be located between/"contained by" the circumferential upper bead, $T_{BU}$, or the tire, T, and the upper bead seat, $W_{SU}$, of the wheel, W, and/or the circumferential lower bead, $T_{BL}$, of the tire, T, and the lower bead seat, $W_{SL}$, of the wheel, W. Upon the bead seater apparatus 10 spatially manipulating: (1) the tire, T, relative the wheel, W, and/or (2) the wheel, W, relative the tire, T, the one or more entrapments, E, may be exposed to atmosphere, A (see, e.g., FIG. 10B); by exposing the one or more entrapments, E, to atmosphere, A, the one or more entrapments, E, may no longer be said to be "contained by" the inflated tire-wheel assembly, $TW_{I-U}$, and, as a result, the one or more entrapments, E, may be permitted to escape from (i.e., removed from) the inflated tire-wheel assembly, $TW_{I-U}$, to atmosphere, A, as seen in FIG. 10B.

Referring to FIG. 1A, in some implementations, the bead seater apparatus 10 includes a tire-wheel-assembly-lifting portion 12a and a canopy portion 12b. The canopy portion 12b is arranged over the tire-wheel-assembly-lifting portion 12a.

After arranging one or more of the tire, T, and the wheel, W, of the unprocessed, inflated tire-wheel assembly, $TW_{I-U}$, in direct contact with the tire-wheel-assembly lifting portion 12a as seen in FIG. 1B, the tire-wheel-assembly lifting portion 12a lifts/moves the unprocessed, inflated tire-wheel assembly, $TW_{I-U}$, upwardly, U, and away from the underlying ground surface, G, and toward the canopy portion 12b such that one or more of the tire, T, and the wheel, W, of the unprocessed, inflated tire-wheel assembly, $TW_{I-U}$, is arranged in direct contact with the canopy portion 12b as seen in FIG. 1C such that the tire, T, of the unprocessed, inflated tire-wheel assembly, $TW_{I-U}$, is compressed (i.e., firstly spatially manipulated) by the tire-wheel-assembly-lifting portion 12a and the canopy portion 12b; thereafter, one or more of the tire-wheel-assembly-lifting portion 12a and the canopy portion 12b may further spatially manipulate: (1) the tire, T, relative the wheel, W, and/or (2) the wheel, W, relative the tire, T (by, e.g., vibrating and/or rotating the unprocessed, inflated tire-wheel assembly, $TW_{I-U}$).

After spatially manipulating: (1) the tire, T, relative the wheel, W, and/or (2) the wheel, W, relative the tire, T, the tire-wheel-assembly lifting portion 12a lowers/moves the seated, inflated tire-wheel assembly, $TW_{I-S}$, downwardly, D (see, e.g., FIG. 1C), toward the underlying ground surface, G, and away the canopy portion 12b such that the seated, inflated tire-wheel assembly, $TW_{I-S}$, is no longer in direct contact with one or more portions of the canopy portion 12b and is no longer compressed by both of the tire-wheel-assembly-lifting portion 12a and the canopy portion 12b. Then, as seen in FIG. 1D, the seated, inflated tire-wheel assembly, $TW_{I-S}$, may be arranged in a manner/moved such that the seated, inflated tire-wheel assembly, $TW_{I-S}$, is no longer arranged upon the tire-wheel-assembly lifting portion 12a by, e.g., conveying (e.g., to the right, R) the seated, inflated tire-wheel assembly, $TW_{I-S}$, away from the tire-wheel-assembly lifting portion 12a (as seen, in e.g., FIG. 1E).

In another implementation, the bead seater apparatus 10 may further include a conveyor portion 12c. The conveyor portion 12c may include first conveyor portion 12c' and a second conveyor portion 12c". As seen in FIG. 1A, the first conveyor portion 12c' presents (e.g., to the right, R) the unprocessed, inflated tire-wheel assembly, $TW_{I-U}$, to the tire-wheel-assembly-lifting portion 12a. As seen in FIG. 1D, the second conveyor portion 12c" removes/transports the seated, inflated tire-wheel assembly, $TW_{I-S}$, away from the tire-wheel-assembly-lifting portion 12a (e.g., to the right, R).

Referring to FIGS. 1A-1E, the apparatus may further include a controller 14 connected to one or more motors 16. The one or more motors 16 may be connected to each of: the tire-wheel-assembly-lifting portion 12a, the canopy portion 12b, the first conveyor portion 12c' and the second conveyor portion 12c". The controller 14 may include, for example, a processor executing a program stored in memory. The program may contain instructions for automatically controlling the one or more motors 16 that, in turn, automatically operates: the tire-wheel-assembly-lifting portion 12a, the canopy portion 12b, the first conveyor portion 12c' and the second conveyor portion 12c". Alternatively, the controller 14 may include, for example, one or more joysticks, levers, buttons or the like for manually controlling the one or more motors 16 that, in turn, operates: the tire-wheel-assembly-lifting portion 12a, the canopy portion 12b, the first conveyor portion 12c' and the second conveyor portion 12c". In some implementations, the controller 14 may include, for example, both of a processor executing a program stored in memory and one or more joysticks, levers, buttons or the like for permitting a semi-automatic (i.e., automatic and manual) control over the one or more motors 16 that, in turn, operates: the tire-wheel-assembly-lifting portion 12a, the canopy portion 12b, the first conveyor portion 12c' and the second conveyor portion 12c".

Figure 3A:
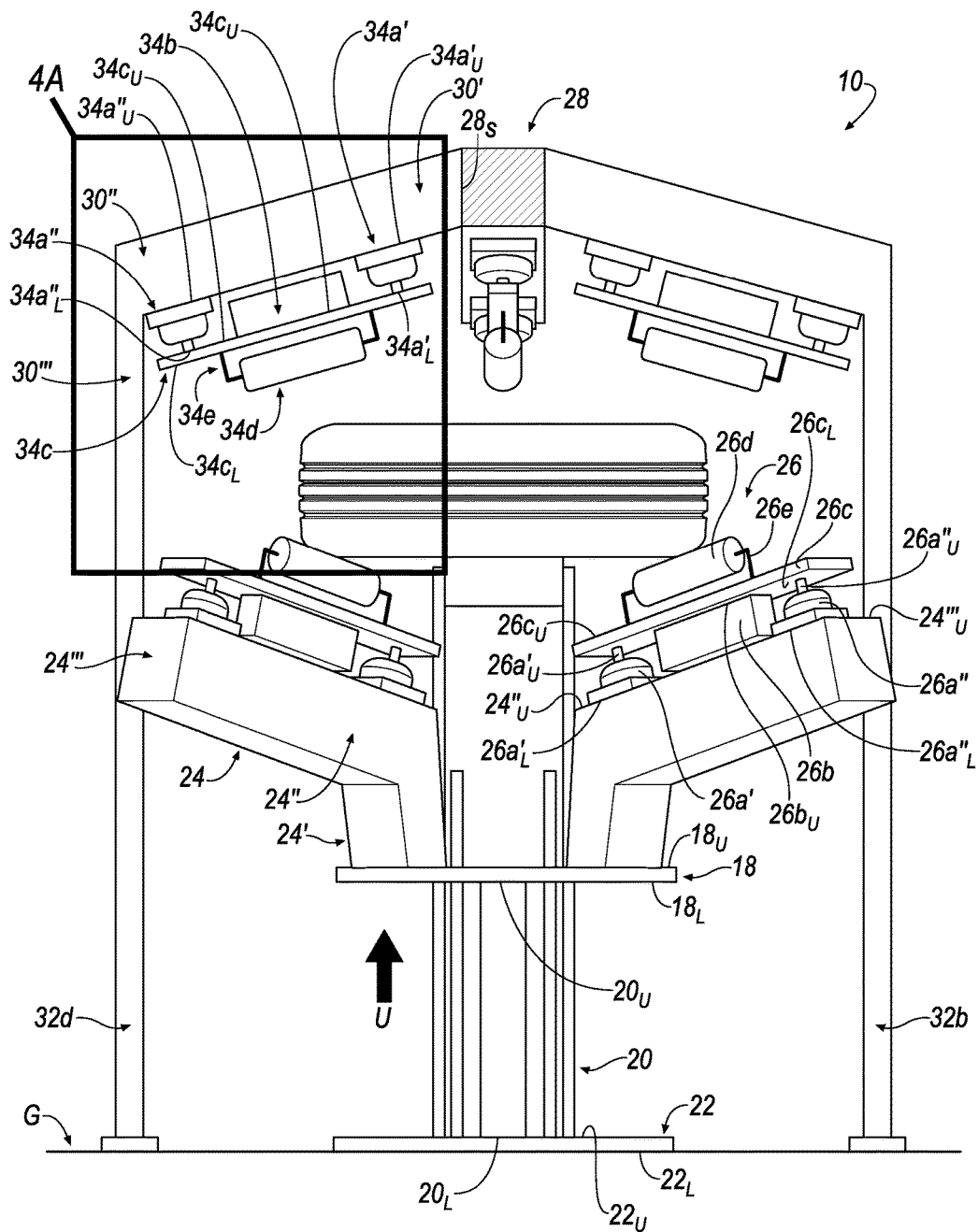
FIGS. 3A and 3B illustrate side views of the bead seater apparatus of FIGS. 1A-1E.
Figure 3B:
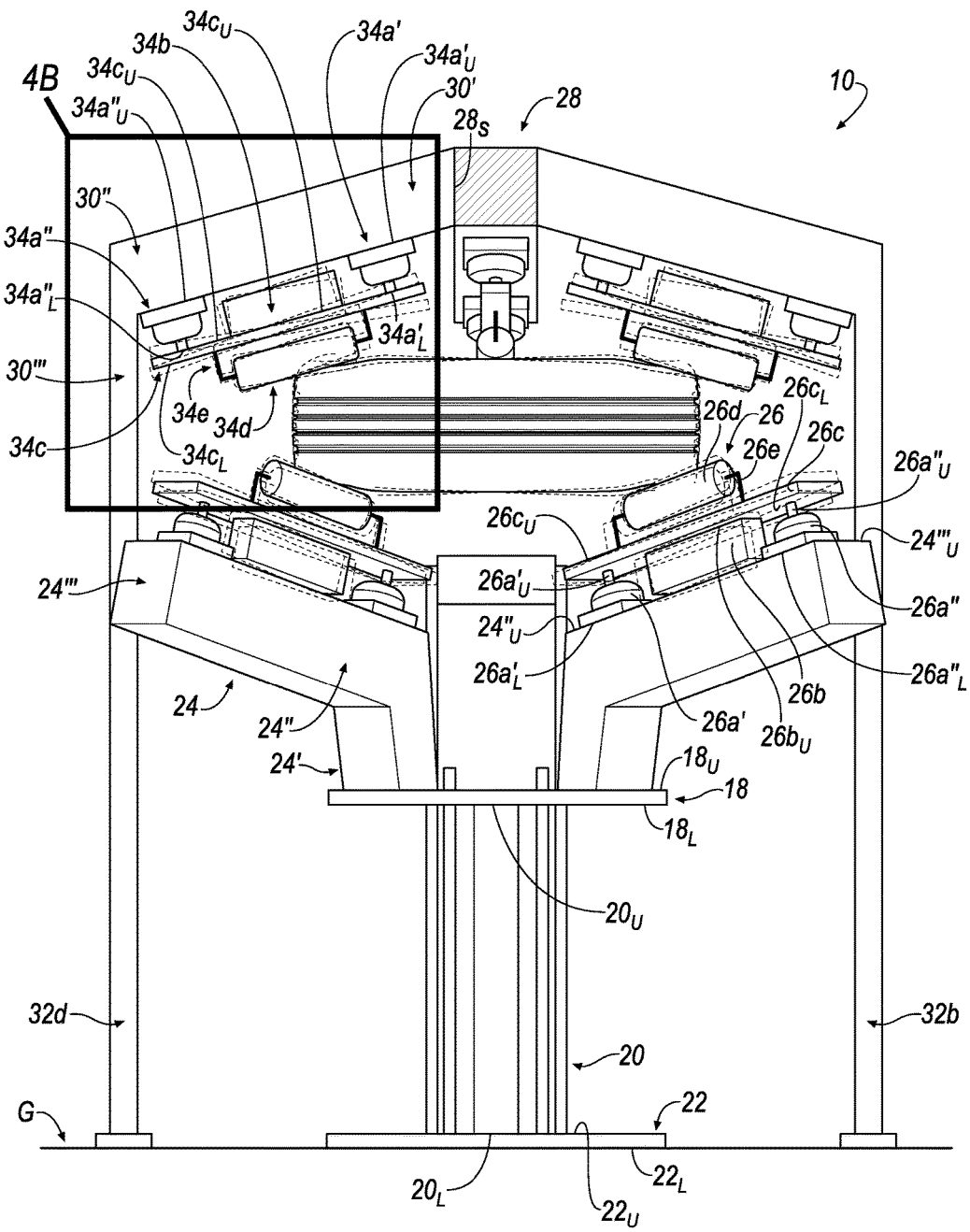

The tire-wheel-assembly-lifting portion 12a may include a head portion 18, a neck portion 20 and a base portion 22. Referring to FIGS. 3A-3B, a lower surface $22_L$ of the base portion 22 may be connected to the underlying ground surface, G. A lower surface $20_L$ of the neck portion 20 may be connected to and telescopingly extend away from an upper surface $22_U$ of the base portion 22. An upper surface $20_U$ of the neck portion 20 may be connected to a lower surface $18_L$ of the head portion 18.

Figure 2:
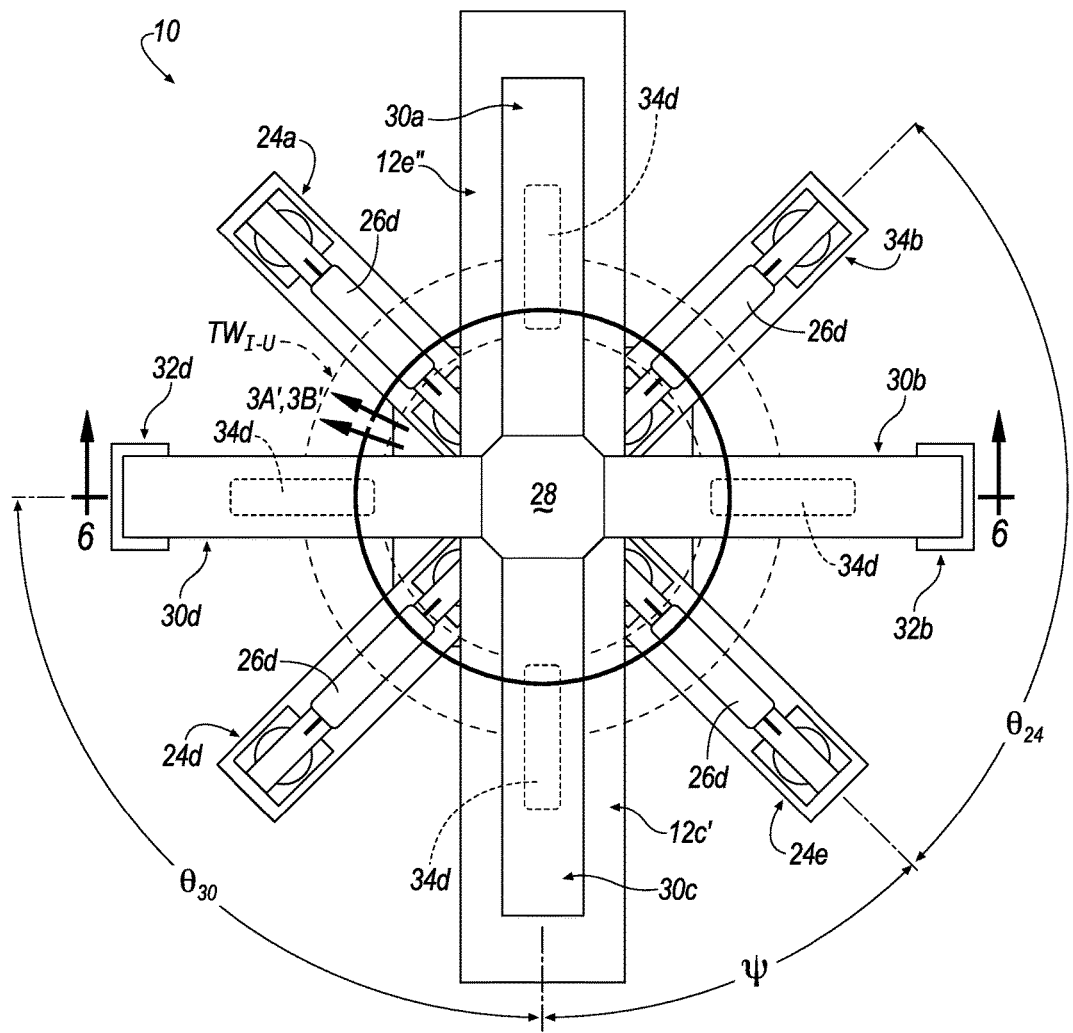
FIG. 2 illustrates a top view of the bead seater apparatus of FIGS. 1A-1E.

Referring to FIGS. 1A-1E, a plurality of tire-wheel-assembly-supporting arms 24 may be connected to and extend away from an upper surface $18_U$ of the head portion 18. In some implementations, the plurality of tire-wheel-assembly-supporting arms 24 includes: a first tire-wheel-assembly-supporting arm 24a, a second tire-wheel-assembly-supporting arm 24b, a third tire-wheel-assembly-supporting arm 24c and a fourth tire-wheel-assembly-supporting arm 24d. Each of the first, second, third and fourth tire-wheel-assembly-supporting arms 24a-24d may be spaced apart from each other at any desirable angular orientation, $\theta_{24}$ (see, e.g., FIG. 2), in some implementations, the angular orientation, $\theta_{24}$, may be equal to approximately about 90°.

Referring to FIGS. 3A-3B, in some implementations, each of the first, second, third and fourth tire-wheel-assembly-supporting arms 24a-24d may include: a proximal portion 24', an intermediate portion 24" and a distal portion 24'". The proximal portion 24' of each of the first, second, third and fourth tire-wheel-assembly-supporting arms 24a-24d may be attached to and extend away from the upper surface $18_U$ of the head portion 18.

Referring to FIGS. 1A-1E, the intermediate portion 24" and the distal portion 24'" may support a lower tire-sidewall-surface-engaging device 26. Referring to FIGS. 3A-3B, the lower tire-sidewall-surface-engaging device 26 may include: a first shock absorber 26a', a second shock absorber 26a", a vibrator 26b, a support member 26c, a roller member 26d and a roller supporter 26e.

A lower surface $26a'_L$ of the first shock absorber 26a' may be attached to an upper surface $24"_U$ of the intermediate portion 24". A lower surface $26a"_L$ of the second shock absorber 26a" may be attached to an upper surface $24'''_U$ of the distal portion 24'". An upper surface $26a'_U$ of the first shock absorber 26a' and an upper surface $26a"_U$ of the second shock absorber 26a" may be attached to a lower surface $26c_L$ of the support member 26c. An upper surface $26b_U$ of the vibrator 26b may be attached to the lower surface $26c_L$ of the support member 26c. The roller supporter 26e may extend away from an upper surface $26c_U$ of the support member 26c. The roller member 26d may be non-rotatably-fixed to or rotatably-supported upon the roller supporter 26e.

Referring to FIGS. 1A-1E, the canopy portion 12b may include a body portion 28 and a plurality of tire-wheel-assembly-engaging legs 30. In some implementations, the plurality of tire-wheel-assembly-engaging legs 30 includes: a first tire-wheel-assembly-engaging leg 30a, a second tire-wheel-assembly-engaging leg 30b, a third tire-wheel-assembly-engaging leg 30c and a fourth tire-wheel-assembly-engaging leg 30d. Each of the first, second, third and fourth tire-wheel-assembly-engaging legs 30a-30d may be spaced apart from each other at any desirable angular orientation, $\theta_{30}$ (see, e.g., FIG. 2); in some implementations, the angular orientation, $\theta_{30}$, may be equal to approximately about 90°.

When the canopy portion 12b is arranged over the tire-wheel-assembly-lifting portion 12a, each of the first, second, third and fourth tire-wheel-assembly-engaging legs 30a-30d may be angularly offset at an offset angular orientation, Ψ (see, e.g., FIG. 2), from each of the first, second, third and fourth tire-wheel-assembly-supporting arms 24a-24d. In some implementations, the offset angular orientation, Ψ, may be equal to approximately about 45°.

Referring to FIGS. 3A-3B, in some implementations, each of the first, second, third and fourth tire-wheel-assembly-engaging legs 30a-30d may include: a proximal portion 30', an intermediate portion 30" and a distal portion 30'". The proximal portion 30' of each of the first, second, third and fourth tire-wheel-assembly-engaging legs 30a-30d may be attached to and extend away from a side surface $28_S$ of the body portion 28.

In some implementations, if the plurality of tire-wheel-assembly-engaging legs 30 includes four tire-wheel-assembly-engaging legs 30a-30d, two of the four tire-wheel-assembly-engaging legs 30a-30d further include a foot portion 32b, 32d whereas the remaining two of the four tire-wheel-assembly-engaging legs 30a-30d do not include a foot portion 32b, 32d. In an example, the distal portion 30'" the second tire-wheel-assembly-engaging leg 30b is attached to a first foot portion 32b, and, the distal portion 30'" the fourth tire-wheel-assembly-engaging leg 30d is attached to a second foot portion 32d. Each of the first and second foot portions 32b, 32d are attached to the underlying ground surface, G.

Referring to FIGS. 1A-1E, the proximal portion 30' and the intermediate portion 30" may support an upper tire-sidewall-surface-engaging device 34. Referring to FIGS. 3A-3B, the upper tire-sidewall-surface-engaging device 34 may include: a first shock absorber 34a', a second shock absorber 34a", a vibrator 34b, a support member 34c, a roller member 34d and a roller supporter 34e.

An upper surface $34a'_U$ of the first shock absorber 34a' may be attached to a lower surface $30'_L$ of the proximal portion 30'. An upper surface $34a''_U$ of the second shock absorber 34a" may be attached to a lower surface $30''_L$ of the intermediate portion 30". A lower surface $34a'_L$ of the first shock absorber 34a' and a lower surface $34a''_L$ of the second shock absorber 34a" may be attached to an upper surface $34c_U$ of the support member 34c. A lower surface $34b_U$ of the vibrator 34b may be attached to an upper surface $34c_U$ of the support member 34c. The roller supporter 34e may extend away from a lower surface $34c_L$ of the support member 34c. The roller member 34d may be non-rotatably-fixed to or rotatably-supported upon the roller supporter 34e.

Referring to FIGS. 1A-1E, each of the first conveyor portion 12c' and the second conveyor portion 12c" may include a plurality of support legs 36, a pair of pulleys 38 and a conveyor belt 40. The plurality of support legs 36 are connected to the underlying ground surface, G. The pair of pulleys 38 are connected to the plurality of support legs 36. The conveyor belt 40 is rotationally-supported by the pair of pulleys 38.

Figure 7A:
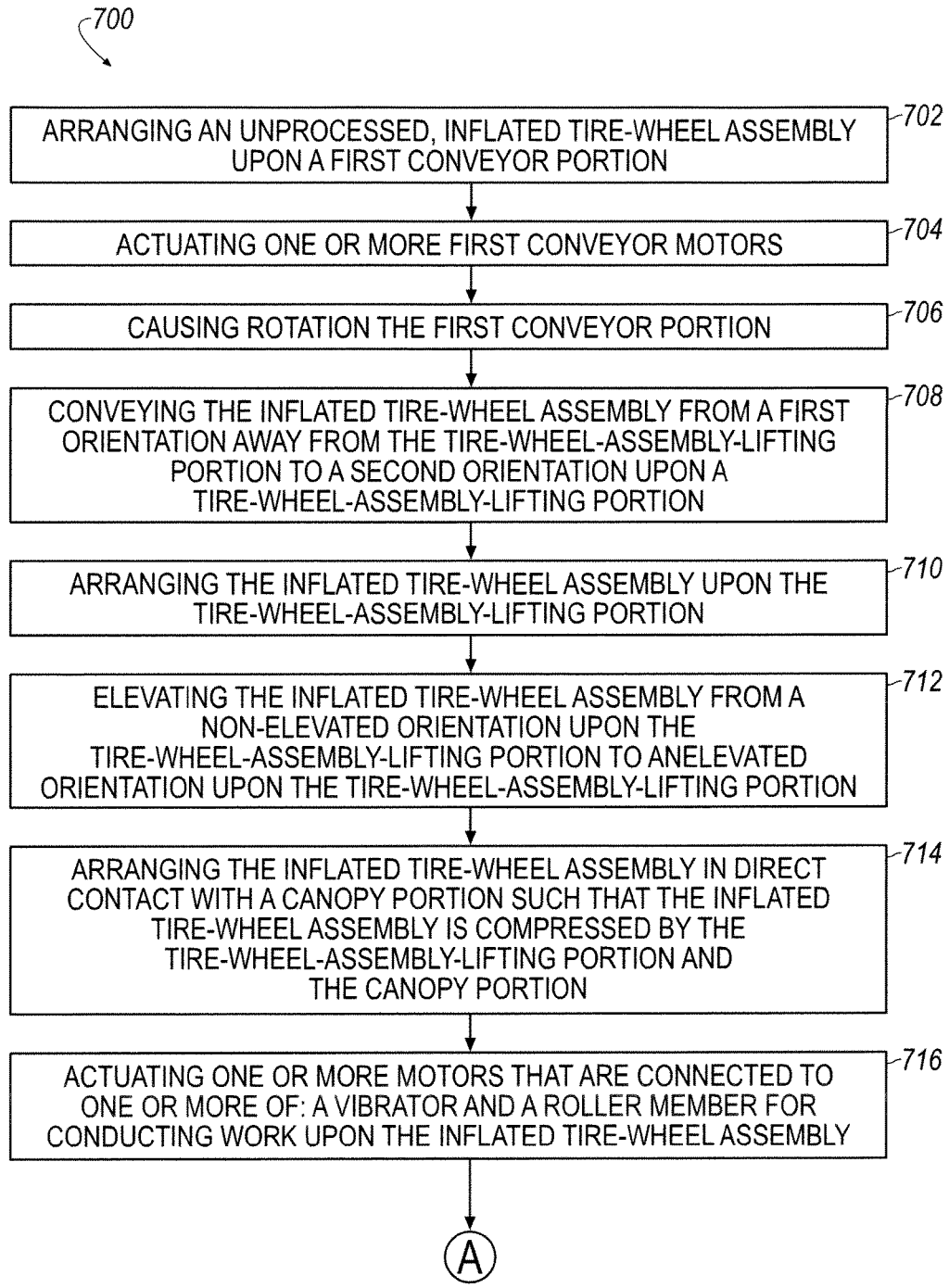
FIGS. 7A-7B illustrate an exemplary method of operating a bead seater apparatus.
Figure 7B:
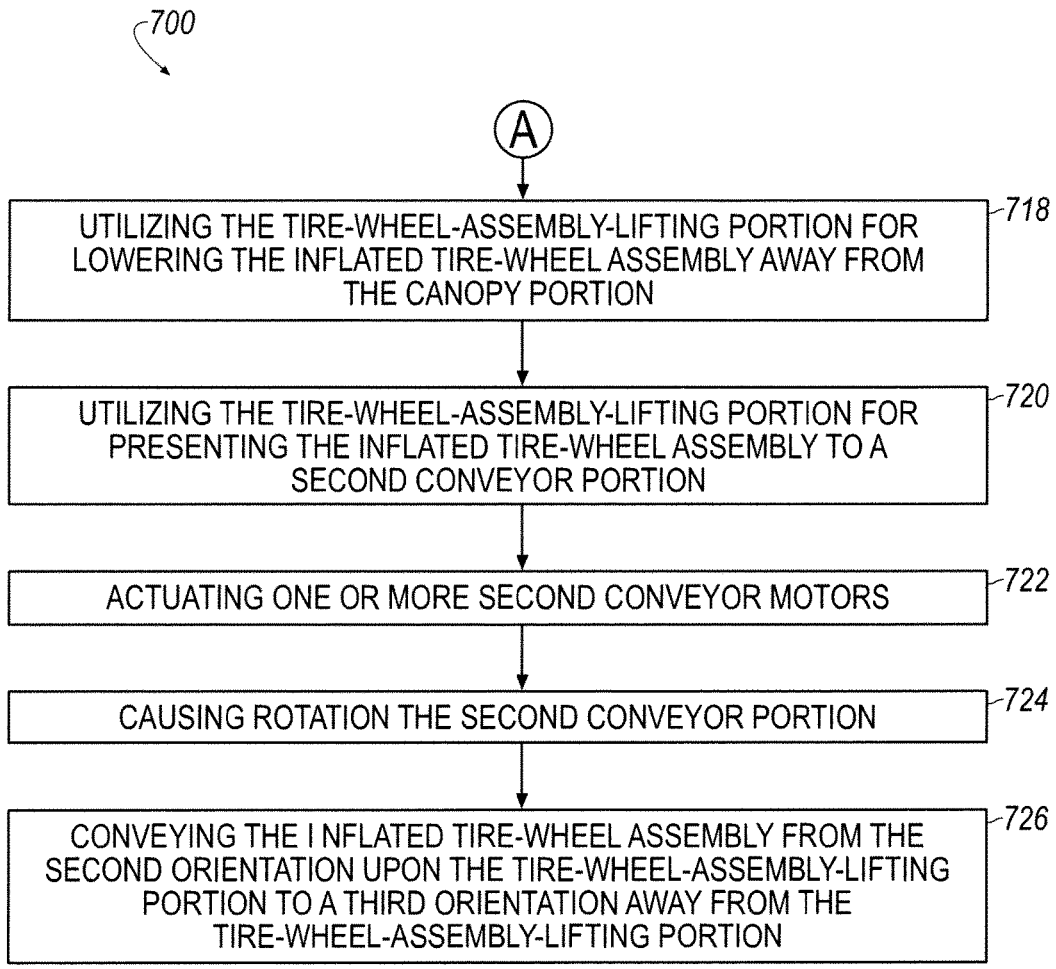

Referring to FIGS. 1A and 7A-7B, a method 700 (as seen in, e.g., FIGS. 7A-7B) for operating the bead seater apparatus 10 is described according to an embodiment. The unprocessed, inflated tire-wheel assembly, $TW_{I-U}$, is firstly arranged (see, e.g., 702 of FIGS. 7A-7B) upon the conveyor belt 40 of the first conveyor portion 12c'. The one or more motors 16 is connected to and causes rotation (see, e.g., 704 of FIGS. 7A-7B) of at least one pulley of the pair of pulleys 38 of the first conveyor portion 12c' in order to cause rotation (see, e.g., 706 of FIGS. 7A-7B) of the conveyor belt 40 of first conveyor portion 12c' in order to convey (see, e.g., 708 of FIGS. 7A-7B) the unprocessed, inflated tire-wheel assembly, $TW_{I-U}$, from a first orientation away from the tire-wheel-assembly-lifting portion 12a as seen in FIG. 1A to a second orientation upon (i.e., in direct contact with) the tire-wheel-assembly-lifting portion 12a as seen in FIG. 1B.

Referring to FIG. 1B, as a result of conveying (see, e.g., 708 of FIGS. 7A-7B) the unprocessed, inflated tire-wheel assembly, $TW_{I-U}$, the unprocessed, inflated tire-wheel assembly, $TW_{I-U}$, is arranged (see, e.g., 710 of FIGS. 7A-7B) upon and direct contact with the tire-wheel-assembly-lifting portion 12a. In an implementation, as a result of the conveying step 708, the lower sidewall surface, $T_{SL}$ (at, e.g., $T_{SL-1}$, $T_{SL-2}$, $T_{SL-3}$, $T_{SL-4}$), of the tire, T, of the unprocessed, inflated tire-wheel assembly, $TW_{I-U}$, may be arranged in direct contact with the roller members 26d of each of: the first tire-wheel-assembly-supporting arm 24a, the second tire-wheel-assembly-supporting arm 24b, the third tire-wheel-assembly-supporting arm 24c and the fourth tire-wheel-assembly-supporting arm 24d.

Figure 4A:
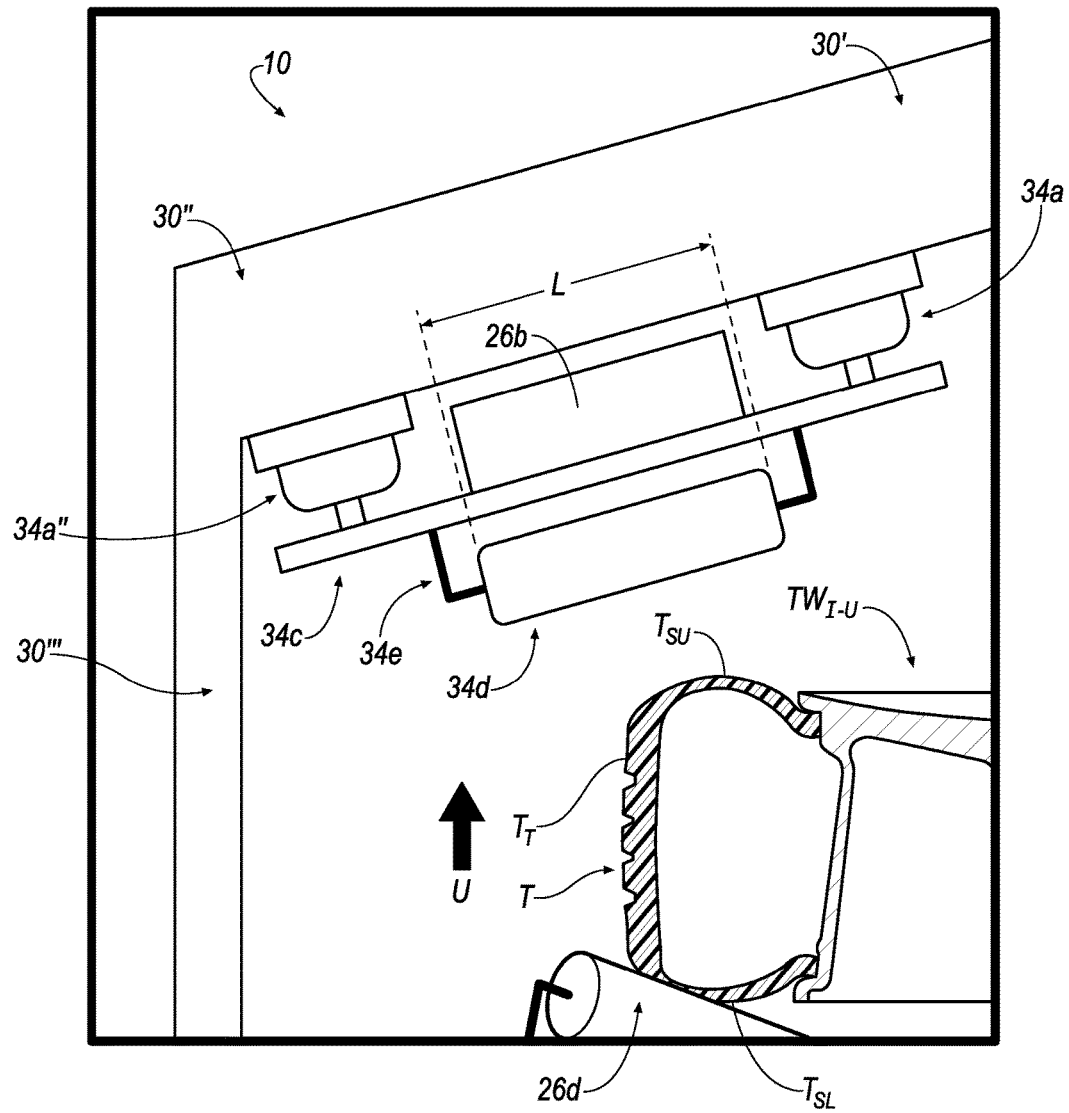
FIG. 4A illustrates an enlarged view according to line 4A of FIG. 3A.
Figures 4B, 4C:
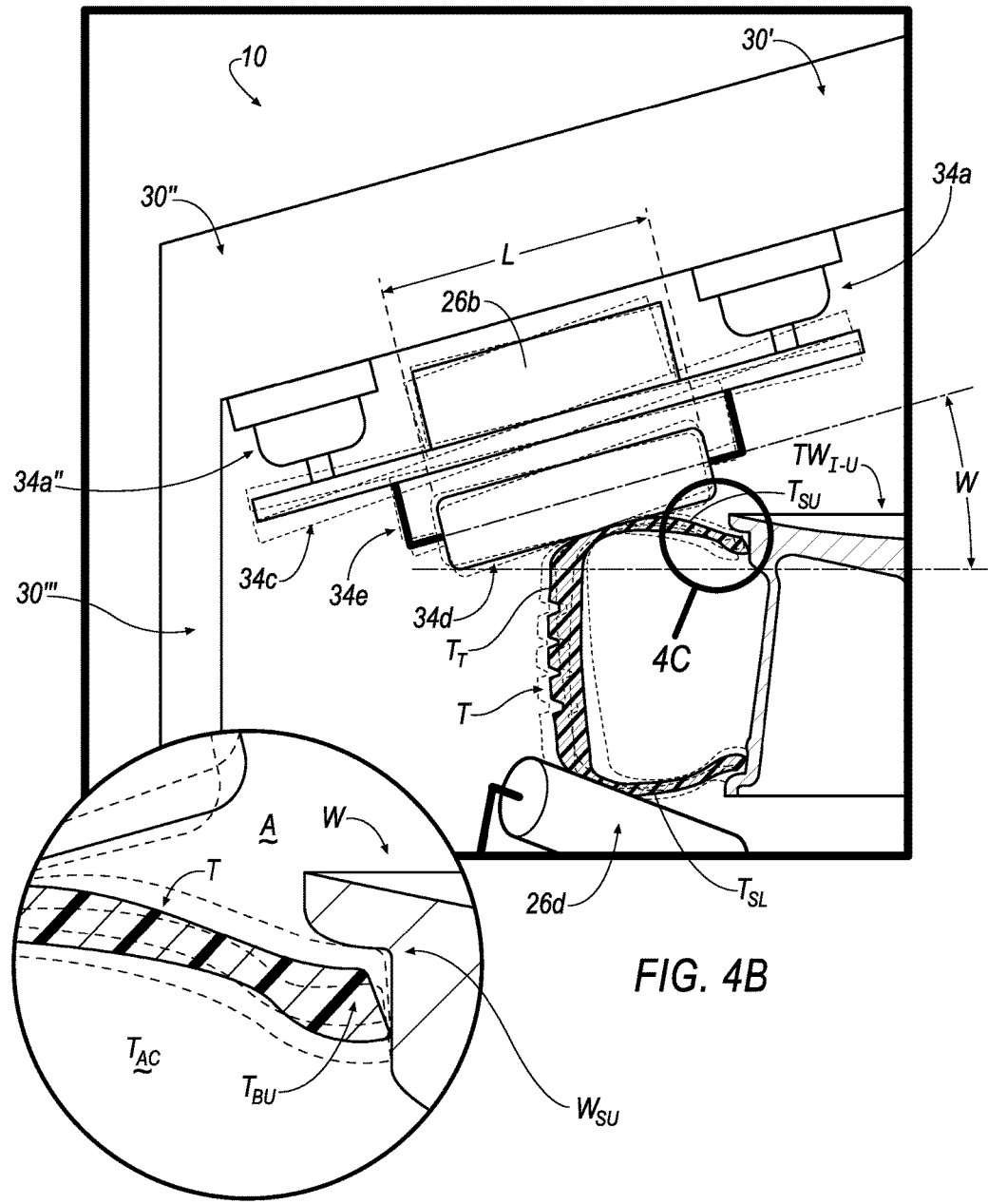
FIG. 4B illustrates an enlarged view according to line 4B of FIG. 3B.
FIG. 4C illustrates an enlarged view according to line 4C of FIG. 4B.

Referring to FIGS. 1C, 3A, 4A and 6A, the one or more motors 16 is connected to the neck portion 20 and causes, for example, telescopic extension of the neck portion 20 in order to elevate, U (see, e.g., 712 of FIGS. 7A-7B), the unprocessed, inflated tire-wheel assembly, $TW_{I-U}$, from the second (non-elevated) orientation upon the tire-wheel-assembly-lifting portion 12a as seen in FIG. 1B to a third (elevated) orientation upon the tire-wheel-assembly-lifting portion 12a as seen in FIG. 1C such that the unprocessed, inflated tire-wheel assembly, $TW_{I-U}$, is presented to and arranged in direct contact with (see, e.g., 714 of FIGS. 7A-7B), as seen in, for example, FIGS. 3B and 4B, the canopy portion 12b such that the unprocessed, inflated tire-wheel assembly, $TW_{I-U}$, is compressed (i.e., firstly spatially manipulated) by the tire-wheel-assembly-lifting portion 12a and the canopy portion 12b. In an implementation, as a result of the elevating 712 and subsequently compressing step 714, the upper sidewall surface, $T_{SU}$ (at e.g., $T_{SU-1}$, $T_{SU-2}$, $T_{SU-3}$, $T_{SU-4}$), of the tire, T, of the unprocessed, inflated tire-wheel assembly, $TW_{I-U}$, may be arranged in direct contact with the roller members 34d of each of: the first tire-wheel-assembly-engaging leg 30a, the second tire-wheel-assembly-engaging leg 30b, the third tire-wheel-assembly-engaging leg 30c and the fourth tire-wheel-assembly-engaging leg 30d.

Referring to FIG. 3A', prior to the compressing step 714, the lower sidewall surface, $T_{SL}$ (at, e.g., $T_{SL-1}$, $T_{SL-2}$, $T_{SL-3}$, $T_{SL-4}$), of the tire, T, of the unprocessed, inflated tire-wheel assembly, $TW_{I-U}$, may be arranged in direct contact with the roller members 26d of each of: the first tire-wheel-assembly-supporting arm 24a, the second tire-wheel-assembly-supporting arm 24b, the third tire-wheel-assembly-supporting arm 24c and the fourth tire-wheel-assembly-supporting arm 24d; because the unprocessed, inflated tire-wheel assembly, $TW_{I-U}$, has not yet been compressed 714, the upper sidewall surface, $T_{SU}$, and the lower sidewall surface, $T_{SL}$, may be substantially parallel to one another. After the compressing step 714, the unprocessed, inflated tire-wheel assembly, $TW_{I-U}$, is arranged in a compressed orientation (see FIG. 3B') between the roller members 26d, 34d (noting that when the compressed orientation occurs, the upper sidewall surface, $T_{SU}$ (at e.g., $T_{SU-1}$, $T_{SU-2}$, $T_{SU-3}$, $T_{SU-4}$), of the tire, T, of the unprocessed, inflated tire-wheel assembly, $TW_{I-U}$, is arranged in direct contact with the roller members 34d of each of: the first tire-wheel-assembly-engaging leg 30a, the second tire-wheel-assembly-engaging leg 30b, the third tire-wheel-assembly-engaging leg 30c and the fourth tire-wheelassembly-engaging leg 30d). As a result of the offset angular orientation, Ψ (see also FIG. 2), the compressed orientation of the unprocessed, inflated tire-wheel assembly, $TW_{I-U}$, may include the upper sidewall surface, $T_{SU}$, and the lower sidewall surface, $T_{SL}$, of the tire, T, being arranged in a substantially sinusoidal orientation.

With continued reference to FIG. 3B', when the unprocessed, inflated tire-wheel assembly, $TW_{I-U}$, is compressed, each of the upper sidewall surface, $T_{SU}$, and the lower sidewall surface, $T_{SL}$, of the tire, T, receives an amount of pressure, P. The locations (see, e.g., $T_{SL-1}$, $T_{SL-2}$, $T_{SL-3}$, $T_{SL-4}$, $T_{SU-1}$, $T_{SU-2}$, $T_{SU-3}$, $T_{SU-4}$) where the amount of pressure, P, applied to each of the upper sidewall surface, $T_{SU}$, and the lower sidewall surface, $T_{SL}$, of the tire, T, is where each roller member 26d, 34d contacts the upper sidewall surface, $T_{SU}$, and the lower sidewall surface, $T_{SL}$. The amount of pressure, P, may be any desirable amount. In some implementations, the amount of pressure, P, may be an amount ranging between approximately about 500 psi to approximately about 1500 psi. In some implementations, the amount of pressure, P, may be an amount selected from a small amount of pressure (e.g. approximately about 500 psi), a medium amount of pressure (e.g., approximately about 1000 psi), and a large amount of pressure (e.g., approximately about 1500 psi).

The one or more motors 16 are connected to one or more of: the vibrators 26b, 34b and the roller members 26d, 34d. After the arranging step 714, the one or more motors 16 that are connected to one or more of: the vibrator 26b, 34b and roller members 26d, 34d are actuated (see, e.g., 716 of FIGS. 7A-7B). Actuation of the one or more motors 16 that are connected to one or more of: the vibrator 26b, 34b and roller members 26d, 34d results in "work" being conducted upon the unprocessed, inflated tire-wheel assembly, $TW_{I-U}$, in order to spatially manipulate: (1) the tire, T, relative the wheel, W, and/or (2) the wheel, W, relative the tire, T, such that one or more entrapments, E, may be exposed to atmosphere, A. The "work," is shown generally at reference letter, W, in FIGS. 1C, 3B, 4B, 5, 6B and 6C, which is represented by phantom lines about at least, for example, the tire, T, in order to illustrate, for example, vibration of the tire, T, relative the wheel, W.

The vibration applied to the tire, T, may be characterized by a frequency; the frequency may be any desirable amount. In some implementations, the frequency may be an amount ranging between approximately about 5600 cycles-per-minute to approximately about 8000 cycles-per-minute.

Although vibrators 26b, 34b are shown attached to the lower surface $26c_L$ of the support member 26c and the upper surface $34c_U$ of the support member 34c, respectively, the structure 10 is not limited to including the vibrators 26b, 34b as well as the vibrators 26b, 34b being attached to the lower surface $26c_L$ of the support member 26c and the upper surface $34c_U$ of the support member 34c, respectively. For example, one or more vibrators may be attached to, for example, one or more of: any component/portion of the tire-wheel-assembly-lifting portion 12a, any component/portion of the canopy portion 12b, any component/portion of the head portion 18, any component/portion of the neck portion 20, any component/portion of the base portion 22, and any component/portion of the first, second, third and fourth tire-wheel-assembly-supporting arms 24a-24d.

In an example, a vibrator (that is connected to a motor) may be attached to the neck portion 20. After the unprocessed, inflated tire-wheel assembly, $TW_{I-U}$, is arranged in a compressed orientation, the vibrator that is attached to the neck portion 20 may be actuated.

In another example, a vibrator (that is connected to a motor) may be attached to the neck portion 20, and, vibrators 26b may be attached to the lower surface $26c_L$ of the support member 26c. After the unprocessed, inflated tire-wheel assembly, $TW_{I-U}$, is arranged in a compressed orientation, the vibrator that is attached to the neck portion 20 and the vibrators 26b attached to the lower surface $26c_L$ of the support member 26c may be actuated.

In yet another example, a vibrator (that is connected to a motor) may be attached to the neck portion 20, and, vibrators 34b may be attached to the upper surface $34c_U$ of the support member 34c. After the unprocessed, inflated tire-wheel assembly, $TW_{I-U}$, is arranged in a compressed orientation, the vibrator that is attached to the neck portion 20 and the vibrators 34b attached to the upper surface $34c_U$ of the support member 34c may be actuated.

In yet a further example, a vibrator (that is connected to a motor) may be attached to the neck portion 20, and, vibrators 26b, 34b may be attached to the lower surface $26c_L$ of the support member 26c and the upper surface $34c_U$ of the support member 34c, respectively. After the unprocessed, inflated tire-wheel assembly, $TW_{I-U}$, is arranged in a compressed orientation, the vibrator that is attached to the neck portion 20, and, vibrators 26b, 34b attached to the lower surface $26c_L$ of the support member 26c and the upper surface $34c_U$ of the support member 34c, respectively, may be actuated.

Referring to FIG. 4B, in an embodiment, the roller members 26d, 34d are designed to include a length, L, and angular orientation, ω (with respect to the underlying ground surface, G), such that the roller members 26d, 34d, in an embodiment, are only permitted to contact one or more of the upper sidewall surface, $T_{SU}$, and the tread surface, $T_T$, of the tire, T, and one or more of the lower sidewall surface, $T_{SL}$, and the tread surface, $T_T$, of the tire, T, respectively. Further, as seen in FIG. 4B, after the compressing step 712, "further work" may include actuating only the vibrators 26b, 34b; because the roller members 26d, 34d are indirectly connected to the vibrators 26b, 34b, upon acting only the vibrators 26b, 34b, the vibrational forces are transmitted from the vibrators 26b, 34b and to the roller members 26d, 34d (by way of the support member 26c, 34c and roller supporter 26e, 34e) for causing further spatial manipulation of the tire, T, relative the wheel, W (i.e., the apparatus 10 imparts a compression then vibration action).

With further reference to the enlarged view of FIG. 4C, the spatial manipulation of the tire, T, relative the wheel, W, is limited to at least temporarily displace circumferential upper bead, $T_{BU}$, and the circumferential lower bead, $T_{BL}$, away from the upper bead seat, $W_{SU}$, and the lower bead seat, $W_{SL}$, without ever "completely breaking" one or more of the circumferential upper bead, $T_{BU}$, and the circumferential lower bead, $T_{BL}$, away from the upper bead seat, $W_{SU}$, and the lower bead seat, $W_{SL}$ (i.e., "completely breaking" one or more of the circumferential upper bead, $T_{BU}$, and the circumferential lower bead, $T_{BL}$, away from the upper bead seat, $W_{SU}$, and the lower bead seat, $W_{SL}$, would adversely result in the pressurized air previously deposited into the circumferential air cavity, $T_{AC}$, of the tire, T, being exposed to atmosphere, A, which would immediately deflate the unprocessed, inflated tire-wheel assembly, $TW_{I-U}$).

Figure 5:
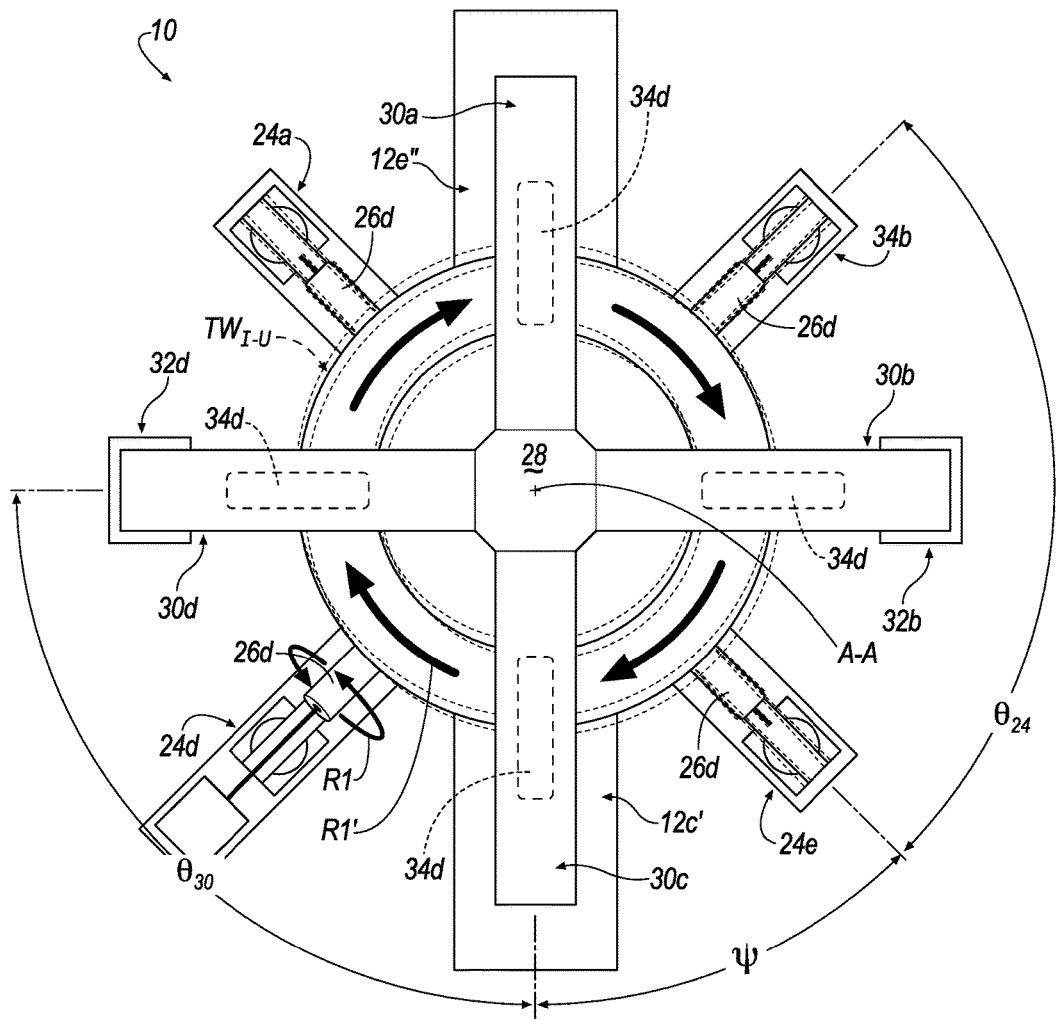
FIG. 5 illustrates a top view of the bead seater apparatus of FIGS. 1A-1E.

Referring to FIG. 5, in addition to "further work" arising from actuating the vibrators 26b, 34b, "yet even further work" may include utilizing the one or more motors 16 for causing rotation, R1, of at least one roller member of the roller members 26d, 34d (i.e., rotation, R1, of at least one roller member results in the at least one roller member acting as a "master" while the remaining roller members act as "slaves"). As a result of rotation, R1, of at least one roller member of the roller members 26d, 34d, the unprocessed, inflated tire-wheel assembly, $TW_{I-U}$, is permitted to be rotated, R1', about an axis, A-A, as the vibrators 26b, 34b, impart vibrational forces to the unprocessed, inflated tire-wheel assembly, $TW_{I-U}$. In another embodiment, the neck portion 20 may cause rotation, R1', of the unprocessed, inflated tire-wheel assembly, $TW_{I-U}$, as vibrators 26b, 34b, impart vibrational forces to the unprocessed, inflated tire-wheel assembly, $TW_{I-U}$. Rotation, R1', of the unprocessed, inflated tire-wheel assembly, $TW_{I-U}$, permits the vibrational forces to be transmitted to substantially all of the circumference of the sidewalls, $T_{SU}$, $T_{SP}$ of the tire, T, rather than the exemplary four portions of the tire, T, that are in closest contact with the vibrators 26b, 34b. In some implementations, one or more of the tire-wheel-assembly-lifting portion 12a and the canopy portion 12b (such as, e.g., the upper end $20_U$ of the neck portion 20) may be directly connected to the wheel, W, in order to ground the unprocessed, inflated tire-wheel assembly, $TW_{I-U}$, for rotation, R1', about the axis, A-A, such that the unprocessed, inflated tire-wheel assembly, $TW_{I-U}$, may be co-axially-aligned with the axis, A-A, during rotation, R1', of the unprocessed, inflated tire-wheel assembly, $TW_{I-U}$.

Figure 6A:
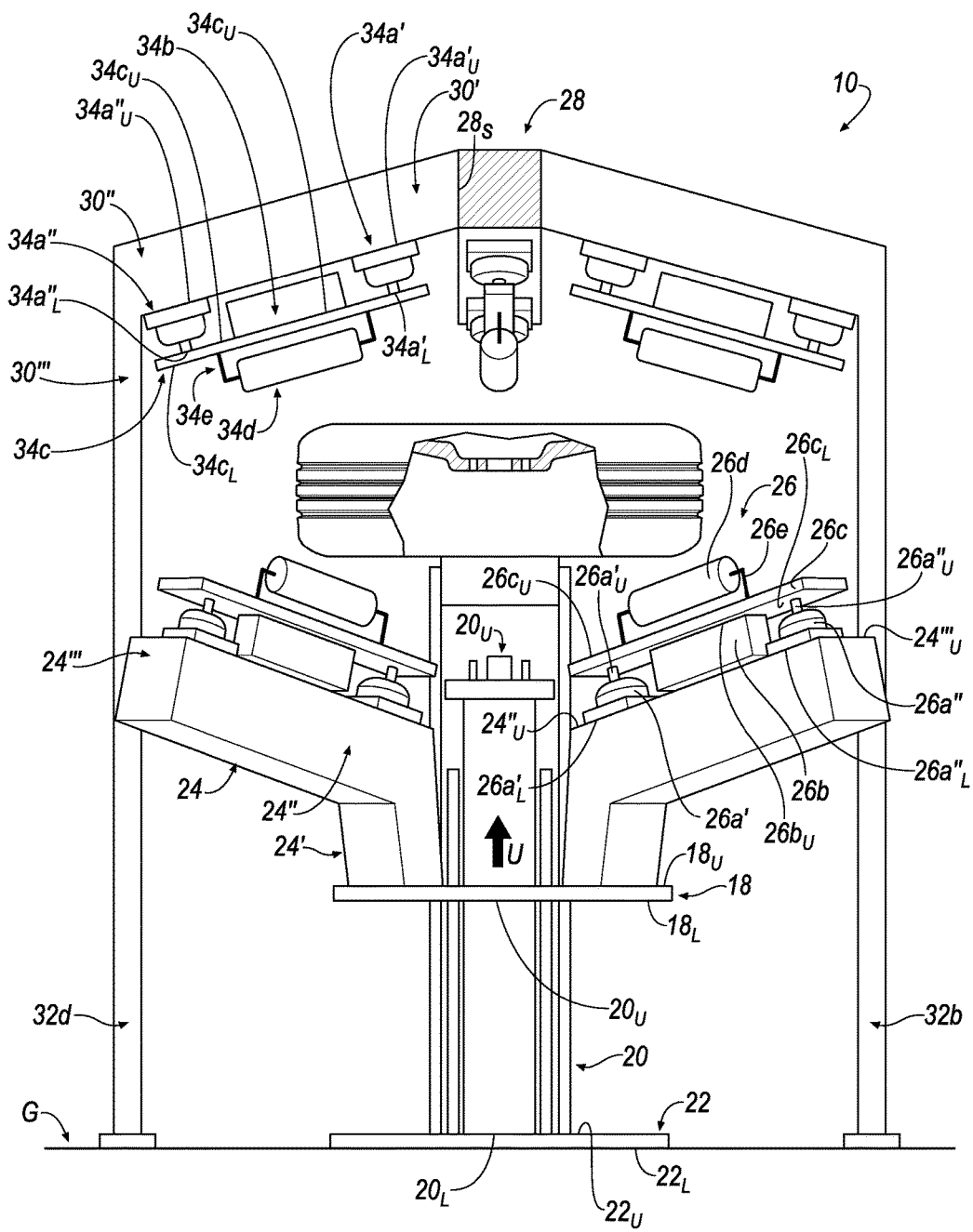
FIGS. 6A-6C illustrate side views of an exemplary bead seater apparatus.
Figure 6B:
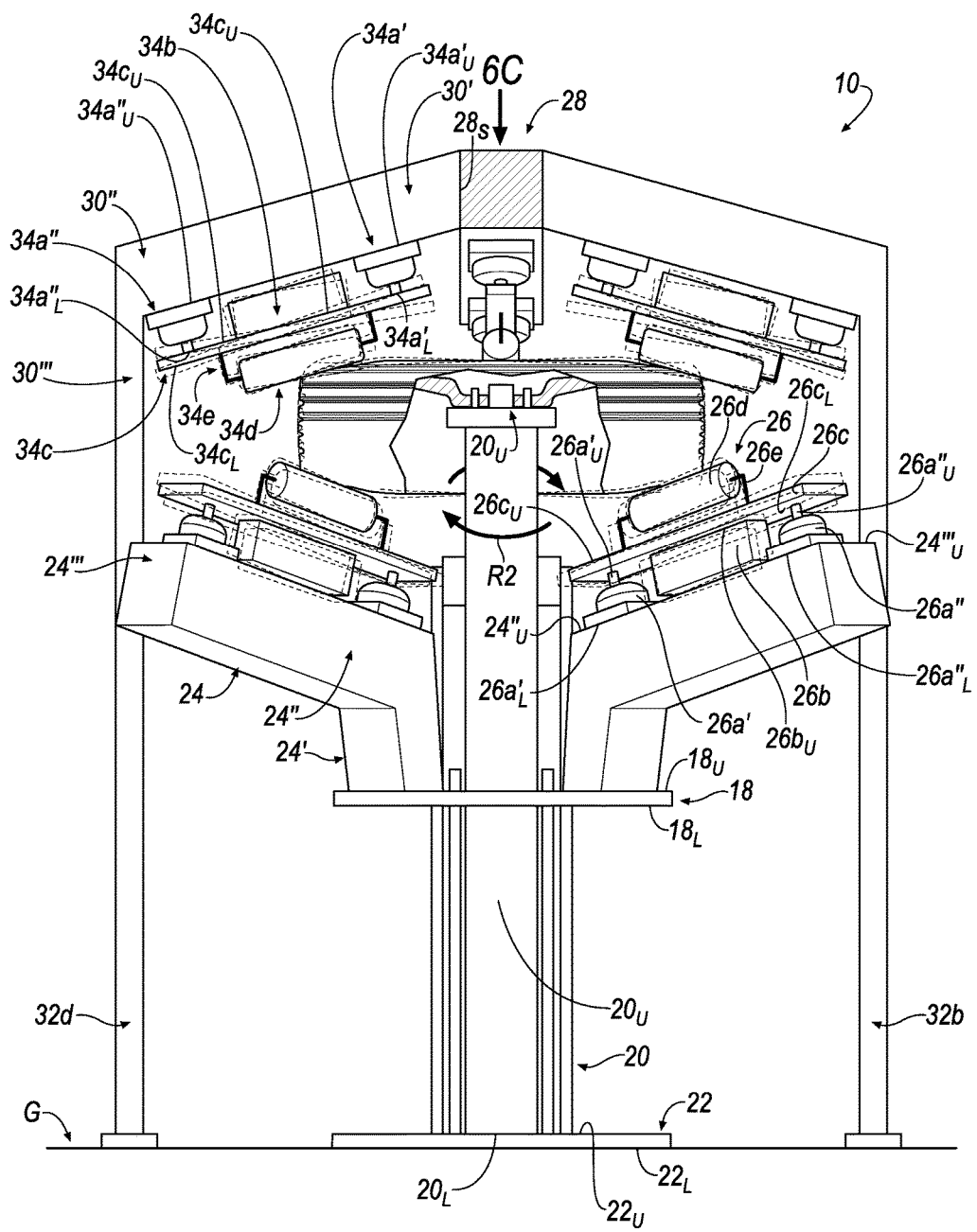
Figure 6C:
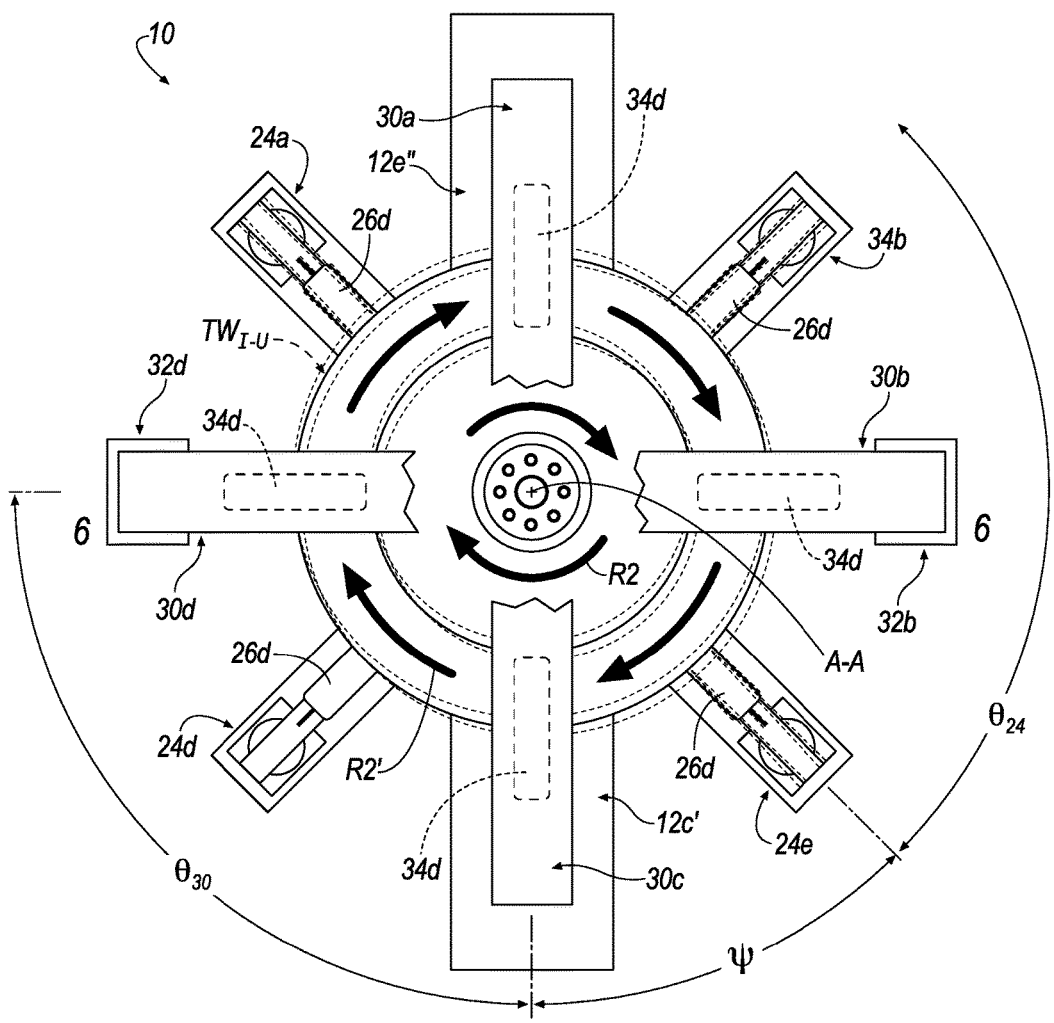

Referring to FIGS. 6B-6C, in addition to "further work" arising from actuating the vibrators 26b, 34b, the "yet even further work" may include utilizing the one or more motors 16 for causing rotation, R2 (see, e.g., FIG. 6B-6C), of the neck portion 20. As a result of rotation of the neck portion 20, the unprocessed, inflated tire-wheel assembly, $TW_{I-U}$, is permitted to be rotated, R2' (see, e.g., FIG. 6C), about an axis, A-A, as the vibrators 26b, 34b, impart vibrational forces to the unprocessed, inflated tire-wheel assembly, $TW_{I-U}$. Rotation of the unprocessed, inflated tire-wheel assembly, $TW_{I-U}$, permits the vibrational forces to be transmitted to substantially all of the circumference of the sidewalls, $T_{SU}$, $T_{SP}$ of the tire, T, rather than the exemplary four portions of the tire, T, that are in closest contact with the vibrators 26b, 34b.

With reference to FIGS. 3A-4B and 6A-6B, the neck portion 20 may cause elevation, U, of the unprocessed, inflated tire-wheel assembly, $TW_{I-U}$, in any desirable manner. For example, in FIGS. 3A-4B, the neck portion 20 may elevate (i.e., push) the head portion 18, which is arranged in direct contact with the unprocessed, inflated tire-wheel assembly, $TW_{I-U}$. Alternatively, in FIGS. 6A-6B, the neck portion 20 may be permitted to extend through the head portion 18 such that a distal/upper end $20_U$ of the neck portion 20 may directly interface with/directly engage/mate with a portion of the wheel, W.

Referring to FIG. 1C, the one or more motors 16 connected to the neck portion 20 causes, for example, telescopic retraction of the neck portion 20 in order to lower, D (see, e.g., 718 of FIGS. 7A-7B), the seated, inflated tire-wheel assembly, $TW_{I-S}$, from the third (elevated) orientation upon the tire-wheel-assembly-lifting portion 12a back to the second (non-elevated) orientation upon the tire-wheel-assembly-lifting portion 12a such that the seated, inflated tire-wheel assembly, $TW_{I-S}$, is presented (see, e.g., 720 of FIGS. 7A-7B) to second conveyor portion 12c''. Referring to FIG. 1D, the one or more motors 16 is connected to and causes rotation (see, e.g., 722 of FIGS. 7A-7B) of at least one pulley of the pair of pulleys 38 of the second conveyor portion 12c'' in order to cause rotation (see, e.g., 724 of FIGS. 7A-7B) of the conveyor belt 40 of first conveyor portion 12c' in order to convey (see, e.g., 726 of FIGS. 7A-7B), for example, to the right, R, the seated, inflated tire-wheel assembly, $TW_{I-S}$, from a second (non-elevated) orientation upon the tire-wheel-assembly-lifting portion 12a to a fourth orientation upon second conveyor portion 12c'' for transporting the seated, inflated tire-wheel assembly, $TW_{I-S}$, away from the tire-wheel-assembly-lifting portion 12a as seen in FIG. 1E.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A portion of an apparatus for processing an inflated tire-wheel assembly, comprising:
   a canopy portion including
      a body portion, and
      a plurality of tire-wheel-assembly-engaging legs extending away from the body portion, wherein the plurality of tire-wheel-assembly-engaging legs include at least:
         a first tire-wheel-assembly-engaging leg, and
         a second tire-wheel-assembly-engaging leg
            wherein the first tire-wheel-assembly-engaging leg and the second tire-wheel-assembly-engaging leg are spaced apart from each other at an angular orientation.

2. The portion of the apparatus according to claim 1, wherein the angular orientation is equal to approximately about 180°.

3. The portion of the apparatus according to claim 2, wherein the plurality of tire-wheel-assembly-engaging legs further include:
   a third tire-wheel-assembly-engaging leg, and
   a fourth tire-wheel-assembly-engaging leg, wherein each of the first, second, third and fourth tire-wheel-assembly-engaging legs are spaced apart from each other at an angular orientation equal to approximately about 90°.

4. The portion of the apparatus according to claim 1, wherein each of the first, second, third and fourth tire-wheel-assembly-engaging legs include:
   a proximal portion,
   an intermediate portion, and
   a distal portion, wherein the proximal portion of each of the first, second, third and fourth tire-wheel-assembly-engaging legs is attached to and extends away from a side surface of the body portion.

5. The portion of the apparatus according to claim 4, wherein the proximal portion and the intermediate portion supports
   an upper tire-sidewall-surface-engaging device, wherein the upper tire-sidewall-surface-engaging device includes:
      a first shock absorber,
      a second shock absorber,
      a vibrator,
      a support member,
      a roller member, and
      a roller supporter.

6. The portion of the apparatus according to claim 5, wherein an upper surface of the first shock absorber is attached to a lower surface of the proximal portion, wherein an upper surface of the second shock absorber is attached to a lower surface of the intermediate portion, wherein a lower surface of the first shock absorber and a lower surface of the second shock absorber is attached to an upper surface of the support member, wherein a lower surface of the vibrator is attached to an upper surface of the support member, wherein the roller supporter extends away from a lower surface of the support member, wherein the roller member is non-rotatably-fixed to or rotatably-supported upon the roller supporter.

7. The portion of the apparatus according to claim 3, further comprising:
a conveyor portion including a first conveyor portion and a second conveyor portion.

8. The portion of the apparatus according to claim 7, further comprising:
a controller connected to one or more motors, wherein the one or more motors is connected to the canopy portion, the first conveyor portion and the second conveyor portion.

9. The portion of the apparatus according to claim 8, wherein the controller includes a processor executing a program stored in memory, wherein the program contains instructions for automatically controlling the one or more motors that, in turn, automatically operates: the canopy portion, the first conveyor portion and the second conveyor portion.

10. The portion of the apparatus according to claim 8, wherein the controller includes one or more joysticks, levers, buttons or the like for manually controlling the one or more motors that, in turn, operates: the canopy portion, the first conveyor portion and the second conveyor portion.

11. A method for processing an inflated tire-wheel assembly, comprising the steps of:
compressing the inflated tire-wheel assembly directly adjacent a canopy portion; and
actuating one or more motors that are connected to one or more of: a vibrator and a roller member for conducting work upon the inflated tire-wheel assembly.

12. The method according to claim 11, wherein the vibrator vibrates at a frequency ranging between approximately about 5600 cycles-per-minute to approximately about 8000 cycles-per-minute.

13. The method according to claim 11, wherein conducting work includes:
vibrating the inflated tire-wheel assembly after the inflated tire-wheel assembly is compressed directly adjacent the canopy portion.

14. The method according to claim 11, wherein conducting work includes
vibrating the inflated tire-wheel assembly and rotating the inflated tire-wheel assembly after the inflated tire-wheel assembly is compressed directly adjacent the canopy portion.

15. The method according to claim 11, further comprising the step of:
lowering the inflated tire-wheel assembly away from the canopy portion.

16. The method according to claim 15, further comprising the step of:
presenting the inflated tire-wheel assembly to a conveyor portion.

17. The method according to claim 16, further comprising the step of:
actuating one or more conveyor motors for
causing rotation of the conveyor portion for
conveying the inflated tire-wheel assembly from a first orientation to a second orientation.

18. The method according to claim 11, further comprising the step of:
arranging the unprocessed, inflated tire-wheel assembly upon a conveyor portion;
actuating one or more conveyor motors for
causing rotation of the conveyor portion for
conveying the inflated tire-wheel assembly from a first orientation to a second orientation.

19. A method for processing an inflated tire-wheel assembly, comprising the step of:
compressing the inflated tire-wheel assembly directly adjacent a canopy portion, wherein the compressed inflated tire-wheel assembly includes a tire, wherein the compressed inflated tire-wheel assembly results in an upper sidewall surface and a lower sidewall surface of the tire being arranged in a pattern defined by a plurality of peaks and valleys.

20. The method according to claim 19, wherein the pattern defined by the plurality of peaks and valleys is a sinusoidal pattern.

21. The method according to claim 19, wherein the inflated tire-wheel assembly is compressed by a pressure.

22. The method according to claim 21, wherein the pressure includes an amount ranging between approximately about 500 psi to approximately about 1500 psi.

23. The method according to claim 22, wherein the pressure includes an amount ranging between approximately about 500 psi to approximately about 1000 psi.

24. The method according to claim 22, wherein the pressure includes an amount ranging between approximately about 1000 psi to approximately about 1500 psi.

25. A method for processing an inflated tire-wheel assembly, comprising the steps of:
compressing the inflated tire-wheel assembly between a tire-wheel-assembly-lifting portion and a canopy portion;
rotating the inflated tire-wheel assembly after the inflated tire-wheel assembly is compressed between the tire-wheel-assembly-lifting portion and a canopy portion; and
seating a bead of a tire of the inflated tire-wheel assembly adjacent a bead seat of a wheel of the tire-wheel assembly.

26. The method according to claim 25, wherein the rotating step includes:
actuating a motor connected to a roller member that engages the tire of the inflated tire-wheel assembly, wherein the roller member is connected to one of the tire-wheel-assembly-lifting portion and the canopy portion.

27. The method according to claim 26, wherein the seating step includes:
actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

28. The method according to claim 26, wherein the seating step includes:
actuating a motor connected to a vibrator that engages the tire of the inflated tire-wheel assembly for vibrating the tire, wherein the vibrator is connected to one of the tire-wheel-assembly-lifting portion and the canopy portion.

29. The method according to claim 25, wherein the rotating step includes:
actuating a motor connected to at least one roller member of a plurality of roller members that engage the tire of the inflated tire-wheel assembly, wherein the at least one roller member is connected to one of the tire-wheel-assembly-lifting portion and the canopy portion.

30. The method according to claim 29, wherein the seating step includes:
actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

31. The method according to claim 29, wherein the seating step includes:
actuating a motor connected to a vibrator that engages the tire of the inflated tire-wheel assembly for vibrating the tire, wherein the vibrator is connected to one of the tire-wheel-assembly-lifting portion and the canopy portion.

32. The method according to claim 26, wherein the rotating step includes:
actuating a motor connected to a wheel-engaging portion that engages the wheel of the inflated tire-wheel assembly, wherein the wheel-engaging portion is connected to the tire-wheel-assembly-lifting portion.

33. The method according to claim 32, wherein the seating step includes:
actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

34. The method according to claim 32, wherein the seating step includes:
actuating a motor connected to a vibrator that engages the tire of the inflated tire-wheel assembly for vibrating the tire, wherein the vibrator is connected to one of the tire-wheel-assembly-lifting portion and the canopy portion.

35. The method according to claim 25, wherein prior to the compressing step, the method includes:
arranging the inflated tire-wheel assembly upon the tire-wheel-assembly-lifting portion;
elevating the inflated tire-wheel assembly from a non-elevated orientation upon the tire-wheel-assembly-lifting portion to an elevated orientation upon the tire-wheel-assembly-lifting portion; and
arranging the inflated tire-wheel assembly in direct contact with the canopy portion for compressing the inflated tire-wheel assembly between the tire-wheel-assembly-lifting portion and the canopy portion.

36. The method according to claim 25, wherein, after the seating step, the method further includes the step of:
utilizing the tire-wheel-assembly-lifting portion for lowering the inflated tire-wheel assembly away from the canopy portion.

37. A method for processing an inflated tire-wheel assembly, comprising the steps of:
arranging a lower sidewall of a tire of the inflated tire-wheel assembly adjacent a plurality of lower tire-sidewall-surface-engaging devices including at least:
a first lower tire-sidewall-surface-engaging device of a tire-wheel-assembly-lifting portion; and
a second lower tire-sidewall-surface-engaging device of the tire-wheel-assembly-lifting portion;
arranging an upper sidewall of the tire of the inflated tire-wheel assembly adjacent a plurality of upper tire-sidewall-surface-engaging devices including at least:
a first upper tire-sidewall-surface-engaging device of a canopy portion; and
a second upper tire-sidewall-surface-engaging device of the canopy portion for compressing the tire of the inflated tire-wheel assembly between the plurality of lower tire-sidewall-surface-engaging devices and the plurality of upper tire-sidewall-surface-engaging devices for manipulating each of the lower sidewall of the tire and the upper sidewall of the tire from a substantially planar orientation to a non-planar orientation.

38. The method according to claim 37, wherein the non-planar orientation is defined by a plurality of peaks and valleys.

39. The method according to claim 37, wherein the non-planar orientation is defined by a sinusoidal orientation.

40. The method according to claim 37, wherein the plurality of lower tire-sidewall-surface-engaging devices are angularly offset from the plurality of upper tire-sidewall-surface-engaging devices.

41. The method according to claim 37 further including the steps of:
rotating the inflated tire-wheel assembly after the inflated tire-wheel assembly is compressed between the tire-wheel-assembly-lifting portion and a canopy portion; and
seating a bead of a tire of the inflated tire-wheel assembly adjacent a bead seat of a wheel of the tire-wheel assembly.

42. The method according to claim 37, wherein the rotating step includes:
actuating a motor connected to a roller member that engages the tire of the inflated tire-wheel assembly, wherein the roller member is connected to one of the tire-wheel-assembly-lifting portion and the canopy portion.

43. The method according to claim 42, wherein the seating step includes:
actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

44. The method according to claim 42, wherein the seating step includes:
actuating a motor connected to a vibrator that engages the tire of the inflated tire-wheel assembly for vibrating the tire, wherein the vibrator is connected to one of the tire-wheel-assembly-lifting portion and the canopy portion.

45. The method according to claim 37, wherein the rotating step includes:
actuating a motor connected to at least one roller member of a plurality of roller members that engage the tire of the inflated tire-wheel assembly, wherein the at least one roller member is connected to one of the tire-wheel-assembly-lifting portion and the canopy portion.

46. The method according to claim 45, wherein the seating step includes:
actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

47. The method according to claim 45, wherein the seating step includes:
  actuating a motor connected to a vibrator that engages the tire of the inflated tire-wheel assembly for vibrating the tire, wherein the vibrator is connected to one of the tire-wheel-assembly-lifting portion and the canopy portion.

48. The method according to claim 37, wherein the rotating step includes:
  actuating a motor connected to a wheel-engaging portion that engages the wheel of the inflated tire-wheel assembly, wherein the wheel-engaging portion is connected to the tire-wheel-assembly-lifting portion.

49. The method according to claim 48, wherein the seating step includes:
  actuating a motor connected to a vibrator that engages the tire of the inflated tire-wheel assembly for vibrating the tire as the inflated tire-wheel assembly is rotated, wherein the vibrator is connected to one of the tire-wheel-assembly-lifting portion and the canopy portion.

50. The method according to claim 48, wherein the seating step includes:
  actuating a motor connected to a vibrator that engages the tire of the inflated tire-wheel assembly for vibrating the tire, wherein the vibrator is connected to one of the tire-wheel-assembly-lifting portion and the canopy portion.

51. The method according to claim 37, wherein prior to the compressing step, the method includes:
  arranging the inflated tire-wheel assembly upon the tire-wheel-assembly-lifting portion;
  elevating the inflated tire-wheel assembly from a non-elevated orientation upon the tire-wheel-assembly-lifting portion to an elevated orientation upon the tire-wheel-assembly-lifting portion; and
  arranging the inflated tire-wheel assembly in direct contact with the canopy portion for compressing the inflated tire-wheel assembly between the tire-wheel-assembly-lifting portion and the canopy portion.

52. The method according to claim 37, wherein, after the seating step, the method further includes the step of:
  utilizing the tire-wheel-assembly-lifting portion for lowering the inflated tire-wheel assembly away from the canopy portion.

* * * * *